US 8,930,265 B2

(12) United States Patent
Blackhurst et al.

(10) Patent No.: US 8,930,265 B2
(45) Date of Patent: Jan. 6, 2015

(54) MONITORING RETAIL TRANSACTIONS ASSOCIATED WITH A FINANCIAL INSTITUTION-BASED MERCHANT OFFER PROGRAM AND DETERMINING SAVINGS METRICS

(75) Inventors: Jason Blackhurst, Charlotte, NC (US); Michael W. Upton, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 206 days.

(21) Appl. No.: 13/013,689

(22) Filed: Jan. 25, 2011

(65) Prior Publication Data

US 2011/0191239 A1   Aug. 4, 2011

Related U.S. Application Data

(60) Provisional application No. 61/299,715, filed on Jan. 29, 2010.

(51) Int. Cl.
  *G06Q 30/02*  (2012.01)
  *G06Q 20/10*  (2012.01)

(52) U.S. Cl.
  CPC .................................... *G06Q 20/10* (2013.01)
  USPC ............................................. 705/39; 705/35

(58) Field of Classification Search
  USPC .................................................... 705/35–45
  See application file for complete search history.

(56) References Cited

U.S. PATENT DOCUMENTS

| | | | |
|---|---|---|---|
| 5,717,923 A | 2/1998 | Dedrick | |
| 5,761,648 A | 6/1998 | Golden et al. | |
| 5,870,770 A | 2/1999 | Wolfe | |
| 5,907,830 A | 5/1999 | Engel et al. | |
| 5,933,811 A | 8/1999 | Angles et al. | |
| 6,006,252 A | 12/1999 | Wolfe | |
| 6,009,411 A | 12/1999 | Kepecs | |
| 6,009,413 A | 12/1999 | Webber et al. | |
| 6,041,309 A | 3/2000 | Laor | |
| 6,055,573 A | 4/2000 | Gardenswartz et al. | |
| 6,076,069 A | 6/2000 | Laor | |
| 6,223,163 B1 | 4/2001 | Van Luchene | |
| 6,263,351 B1 | 7/2001 | Wolfe | |
| 6,282,567 B1 | 8/2001 | Finch, II et al. | |
| 6,292,786 B1 | 9/2001 | Deaton et al. | |
| 6,292,813 B1 | 9/2001 | Wolfe | |
| 6,317,718 B1 | 11/2001 | Fano | |
| 6,321,208 B1 | 11/2001 | Barnett et al. | |

(Continued)

OTHER PUBLICATIONS

International Search Report and the Written Opinion of the International Searching Authority mailed Mar. 28, 2011 for International Application No. PCT/US 11/22771.

(Continued)

*Primary Examiner* — Robert R Niquette
*Assistant Examiner* — Chia Yi Liu
(74) *Attorney, Agent, or Firm* — Michael A. Springs; Moore & Van Allen PLLC; James C. Edwards

(57) ABSTRACT

Embodiments of the invention provide for monitoring transactions and providing related savings metrics in association with a financial institution-based merchant offer program. Since the transaction monitoring occurs at the financial institution level, the savings metrics may include both amounts saved by accepting the merchant offers associated with the program and savings amounts lost by conducting a transaction absent a merchant offer when an applicable merchant offer was available.

11 Claims, 11 Drawing Sheets

(56) References Cited

U.S. PATENT DOCUMENTS

| | | |
|---|---|---|
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,865,545 B1 | 3/2005 | Epstein et al. |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B2 | 1/2007 | Shah |
| 7,181,488 B2 | 2/2007 | Martin et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,257,604 B1 | 8/2007 | Wolfe |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 2001/0039519 A1* | 11/2001 | Richards .................. 705/27 |
| 2002/0062249 A1 | 5/2002 | Iannacci |
| 2002/0091571 A1 | 7/2002 | Thomas et al. |
| 2002/0161670 A1* | 10/2002 | Walker et al. ................ 705/26 |
| 2002/0188509 A1* | 12/2002 | Ariff et al. .................. 705/14 |
| 2002/0190118 A1 | 12/2002 | Davenport et al. |
| 2004/0226995 A1 | 11/2004 | Smith |
| 2005/0021965 A1* | 1/2005 | Van Horn .................. 713/176 |
| 2005/0173517 A1 | 8/2005 | Suk et al. |
| 2005/0177437 A1 | 8/2005 | Ferrier |
| 2006/0253321 A1* | 11/2006 | Heywood .................. 705/14 |
| 2007/0005426 A1 | 1/2007 | Walker et al. |
| 2007/0136418 A1 | 6/2007 | Wolfe |
| 2007/0255620 A1 | 11/2007 | Tumminaro et al. |
| 2008/0091535 A1 | 4/2008 | Heiser, II et al. |
| 2008/0133336 A1 | 6/2008 | Altman et al. |
| 2008/0162316 A1 | 7/2008 | Rampell et al. |
| 2008/0221986 A1 | 9/2008 | Soicher et al. |
| 2008/0249941 A1 | 10/2008 | Cooper |
| 2008/0277465 A1 | 11/2008 | Pletz et al. |
| 2009/0094125 A1 | 4/2009 | Killian et al. |
| 2009/0132366 A1 | 5/2009 | Lam et al. |
| 2009/0132415 A1 | 5/2009 | Davis et al. |
| 2009/0170483 A1 | 7/2009 | Barnett et al. |
| 2009/0172728 A1 | 7/2009 | Shkedi et al. |
| 2009/0292599 A1 | 11/2009 | Rampell et al. |
| 2009/0313106 A1 | 12/2009 | Taylor et al. |
| 2009/0319638 A1 | 12/2009 | Faith et al. |

OTHER PUBLICATIONS

International Search Report and the Written Opinion of the International Searching Authority mailed Mar. 29, 2011 for International Application No. PCT/US 11/22779.

International Search Report and the Written Opinion of the International Searching Authority mailed Mar. 25, 2011 for International Application No. PCT/US 11/22781.

International Search Report and the Written Opinion of the International Searching Authority mailed Mar. 25, 2011 for International Application No. PCT/US 11/22783.

International Search Report and the Written Opinion of the International Searching Authority mailed Mar. 29, 2011 for International Application No. PCT/US 11/22785.

International Search Report and the Written Opinion of the International Searching Authority mailed Apr. 8, 2011 for International Application No. PCT/US 11/22765.

Related U.S. Appl. No. 13/013,683, filed Jan. 25, 2011.
Related U.S. Appl. No. 13/013,684, filed Jan. 25, 2011.
Related U.S. Appl. No. 13/013,685, filed Jan. 25, 2011.
Related U.S. Appl. No. 13/013,688, filed Jan. 25, 2011.
Related U.S. Appl. No. 13/013,691, filed Jan. 25, 2011.
Related U.S. Appl. No. 13/013,720, filed Jan. 25, 2011.
Related U.S. Appl. No. 13/013,722, filed Jan. 25, 2011.
Related U.S. Appl. No. 13/013,727, filed Jan. 25, 2011.
Related U.S. Appl. No. 13/013,730, filed Jan. 25, 2011.
Related U.S. Appl. No. 13/013,731, filed Jan. 25, 2011.
Related U.S. Appl. No. 13/013,735, filed Jan. 25, 2011.

* cited by examiner

MONITORING RETAIL TRANSACTIONS ASSOCIATED WITH A FINANCIAL INSTITUTION-BASED MERCHANT OFFER PROGRAM AND DETERMINING SAVINGS METRICS

CLAIM OF PRIORITY UNDER 35 U.S.C. §119

The present application for patent claims priority to Provisional Application No. 61/299,715 entitled "Monitoring Retail Transactions and Determining Savings Metrics Using a Financial Institution-Based Merchant Offer Program" filed Jan. 29, 2010 and assigned to the assignee hereof and hereby expressly incorporated by reference herein.

FIELD

In general, embodiments of the invention relate to methods, systems, apparatus and computer program products for monitoring retail transactions and providing data related to amount saved and, more particularly, monitoring and providing data related to amount saved associated with a financial institution-based merchant offer program.

BACKGROUND

The advent of the Internet has provided merchants with new channels for reaching customers and providing information, advertising, and offers related to their products or services. However, sales and marketing campaigns are often not as effective as they might be, because they provide the customer the wrong information, advertisements, or offers, or alternatively provide the customer the right information, advertisements, or offers at the wrong time. The Internet, likewise, provides customers with the ability to quickly locate information about products or services in which they are interested, and to purchase those products or services, without leaving their computer. However, customers who shop online often cannot find the exact product or service that they want, they fail to find what they want at a price that they find attractive, or they fail to utilize discounts that are available for the products for services. These scenarios result in discounts or promotions offered by the merchant not being utilized or in customers not receiving the benefit of such discounts or promotions.

Financial institutions have large amounts of customer data because they maintain or administer their customers' various financial accounts (i.e., credit card account, checking account, savings account, etc.) and because they also have data related to their customers' purchases. Financial institutions track and store data related to when their customers made the purchases, how much the customers spent, what merchants the customers used to make the purchases, etc. for both online and offline purchases. Furthermore, financial institutions also have direct relationships with many different merchants that use the financial institutions for their own financial needs. Due to the relationships financial institutions have with both customers and merchants, as well as the data that they capture because of those relationships, financial institutions are uniquely positioned to facilitate merchants in providing targeted sales and marketing offers to customers at the time of purchase; and to provide customers with payment options and information (i.e., balances) for making purchasing decisions for products and services.

In addition to utilizing targeted sales and marketing offers, customers also benefit from having the ability to track savings metrics associated with targeted sales and marketing offers, such as amounts saved on a per transaction basis, cumulative savings over a specified time period, percentage saved of a predetermined overall savings goal and the like. From the customer perspective, such savings data reinforces the usefulness of the targeted sales and marketing offers, provide the incentive for the customer to continue to use the targeted sales and marketing offers and allows the customer to plan further purchases that may include use of the merchant offers/discounts.

A need exists to develop systems, methods, apparatus, computer programs and the like that provide for highly effective means for delivering targeted sales and marketing offers to customers and, specifically, financial institution customers. In addition, the desired systems, methods, apparatus and computer program products should provide the ability to readily and effectively track savings metrics associated with the targeted sales and marketing offers and provide for various means of communicating the savings metrics to the customer.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product, and/or other device), methods, or a combination of the foregoing for monitoring transactions and determining transaction-related savings metrics in association with a financial institution-based merchant offer program. The savings metrics may be any data related to realized, potential and/or lost savings as associated with the financial institution-based merchant offer program. The financial institution not only has the ability to track merchant offers associated with the program that are accepted by the customer (thus, resulting in a savings), but the financial institution also has the ability to track or monitor other transactions made by the customer in which relevant merchant offers were available at the time of the transaction but were not accepted or were not made aware of to the customer. As such, the present invention not only provides for savings metrics related to the amount saved, but also provides for savings metrics related to the amount that the customer could have saved if merchant offers related to the program had been used or otherwise accepted by the customer.

In addition, by monitoring and tracking transactions that benefit from the merchant offer program, transactions that failed to benefit from the merchant offer program and transactions outside of the merchant offer program, the present invention is able to determine what types of offers should be presented to the customer in the future and from which merchants.

In addition, the present invention provides multiple means for communicating the savings metrics to the customer, such as via conventional financial institution statements, online banking statements, transactions receipts, to a merchant offer program local interface application, such as a widget, and/or the like.

A method for providing savings monitoring in a financial institution-based merchant offer program defines first embodiments of the invention. The method includes monitoring, via a computing device processor, merchant transactions conducted by a financial institution customer to identify one or more first merchant transactions. The first merchant transactions are based on customer acceptance of first merchant offers associated with the financial institution-based merchant offer program. The method further includes determining, via a computing device processor, one or more savings metrics associated with the first customer transactions and based on savings realized from acceptance of the first merchant offers. In addition, the method includes providing the one or more savings metrics to the financial institution customer.

In specific embodiments of the method determining further includes determining, via the computing device processor, the one or more savings metrics, wherein one of the savings metrics is configured to be a total amount saved for the first merchant transactions, wherein the first merchant transactions occur over a predetermined period of time, such as a month, a year and/or over the life of the financial institution-based merchant offer program. In other related embodiments of the method, determining further comprises determining, via the computing device processor, the one or more savings metrics, wherein one of the savings metrics is configured to be a per transaction savings amount.

In other specific embodiments of the method, providing further includes providing, via a computing device processor, the one or more savings metrics to the financial institution customer via one or more of a financial institution-based merchant offer program user interface application, a merchant transaction receipt, and a financial institution statement, such as an online banking statement or the like.

In still further specific embodiments of the method, monitoring further includes monitoring, via the computing device processor, the merchant transactions conducted by the financial institution customer to identify second merchant transactions. One or more second merchant offers associated with the financial institution-based merchant offer program were available concurrent with the second merchant transaction, the second merchant offers were associated with an item in the second merchant transactions and the second merchant offers were not applied by the financial institution customer in the second merchant transactions. In such embodiments of the method, determining may further include determining, via the computing device processor, one or more lost savings metrics associated with the second customer transactions and providing may further include providing the one or more lost savings metrics to the financial institution customer. In further such embodiment of the method, determining the one or more lost savings metrics may further include determining, via the computing device processor, the one or more lost savings metrics, wherein one of the lost savings metrics is configured to be a total amount lost savings for the second merchant transactions and the second merchant transactions occur over a predetermined period of time, such as a month, a year and/or over a life of the financial institution-based merchant offer program.

In still further related embodiments of the method, determining further included determining, via the computing device processor, the one or more savings metrics, wherein one of the savings metrics is configured to be a percentage saved of a customer savings goal.

Moreover, in further embodiments the method includes automatically transferring, via a computing device processor, at least a portion of savings amounts associated with the first merchant transactions from a first customer-designated account to a second customer-designated account.

An apparatus for providing savings monitoring in a financial institution-based merchant offer program defines second embodiments of the invention. The apparatus includes a computing platform including at least one processor and a memory. The apparatus further includes a financial institution-based merchant offer program application stored in the memory, executable by the processor and configured to communicate merchant offers to financial institution customers based on authentication of the customer. The apparatus further includes a transaction monitoring routine stored in the memory, executable by the at least one processor and configured to identify one or more first merchant transactions. The first merchant transactions are based on customer acceptance of first merchant offers associated with the financial institution-based merchant offer program. In addition, the apparatus includes a savings metric determination routine stored in the memory, executable by the processor and configured to determining one or more savings metrics associated with the first customer transactions and based on savings realized from acceptance of the first merchant offers.

In specific embodiments of the apparatus the savings metric determination routine is further configured to determine the one or more savings metrics, wherein one of the savings metrics is configured to be a total amount saved for the first merchant transactions, such that the first merchant transactions occur over a predetermined period of time, such as a month, a year and/or over the life of the financial institution-based merchant offer program. In other related embodiments of the apparatus, the savings metric determination routine is further configured to determine the one or more savings metrics, in which one of the savings metrics is configured to be a per transaction savings amount.

In other specific embodiments of the apparatus, the financial institution-based merchant offer program application further includes a user interface routine, such as a widget or the like, configured to provide the one or more savings metrics to the financial institution customer. In still further related embodiments the apparatus includes a transaction receipt routine stored in the memory, executable by the processor and configured to provide the one or more savings metrics to the financial institution customer via a first merchant transaction receipt. In additional related embodiments the apparatus includes a network-accessible online financial institution module, stored in the memory, executable by the processor and configured to provide the one or more savings metrics to the financial institution customer via an online financial institution statement.

In further specific embodiments of the apparatus the transaction monitoring routine is further configured to monitor the merchant transactions conducted by the financial institution customer to identify second merchant transactions. One or more second merchant offers associated with the financial institution-based merchant offer program were available concurrent with the second merchant transaction, the second merchant offers were associated with an item in the second merchant transactions and the second merchant offers were not applied by the financial institution customer in the second merchant transactions.

In such related embodiments of the apparatus, the savings metric determination routine may be further configured to determine one or more lost savings metrics associated with the second customer transactions. In such embodiments of the apparatus, the savings metric determination routine is further configured to determine the one or more lost savings metrics, wherein one of the lost savings metrics is configured to be a total amount lost savings for the second merchant transactions, wherein the second merchant transactions occur over a predetermined period of time, such as a month, a year and/or over a life of the financial institution-based merchant offer program.

In still further specific embodiments of the apparatus, the savings metric determination routine is further configured to determine the one or more savings metrics, wherein one of the savings metrics is configured to be a percentage saved of a customer savings goal.

Moreover, in other embodiments the apparatus includes a savings transfer routine stored in the memory, executable by the processor and configured to automatically transferring at least a portion of a savings amounts associated with the first merchant transactions from a first customer-designated account to a second customer-designated account.

A computer program product includes a non-transitory computer-readable medium defines third embodiments of the invention. The computer-readable medium includes a first set of codes for causing a computer to monitor merchant transactions conducted by a financial institution customer to identify one or more first merchant transactions. The first merchant transactions are based on customer acceptance of first merchant offers associated with the financial institution-based merchant offer program. The computer-readable medium also includes a second set of codes for causing a computer to determine one or more savings metrics associated with the first customer transactions and based on savings realized from acceptance of the first merchant offers. In addition, the computer-readable medium includes a third set of codes for causing a computer to provide the one or more savings metrics to the financial institution customer.

Thus, systems, apparatus, methods, and computer program products herein described provide for monitoring transactions and providing transaction-related savings metrics in association with a financial institution-based merchant offer program. Since the transactions are being monitored and the savings metrics determined by a financial institution, the savings metrics may not only include amounts saved by accepting the merchant offers, but also amounts that the customer could have saved if they had accepted an offer and/or been aware of an offer. Additionally, since the transaction monitoring of the present invention, tracks transactions that occur inside and outside of the merchant offer program, the present invention is also capable of determining the type and/or source of future offers, so as to better meet the specific needs of the customer.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
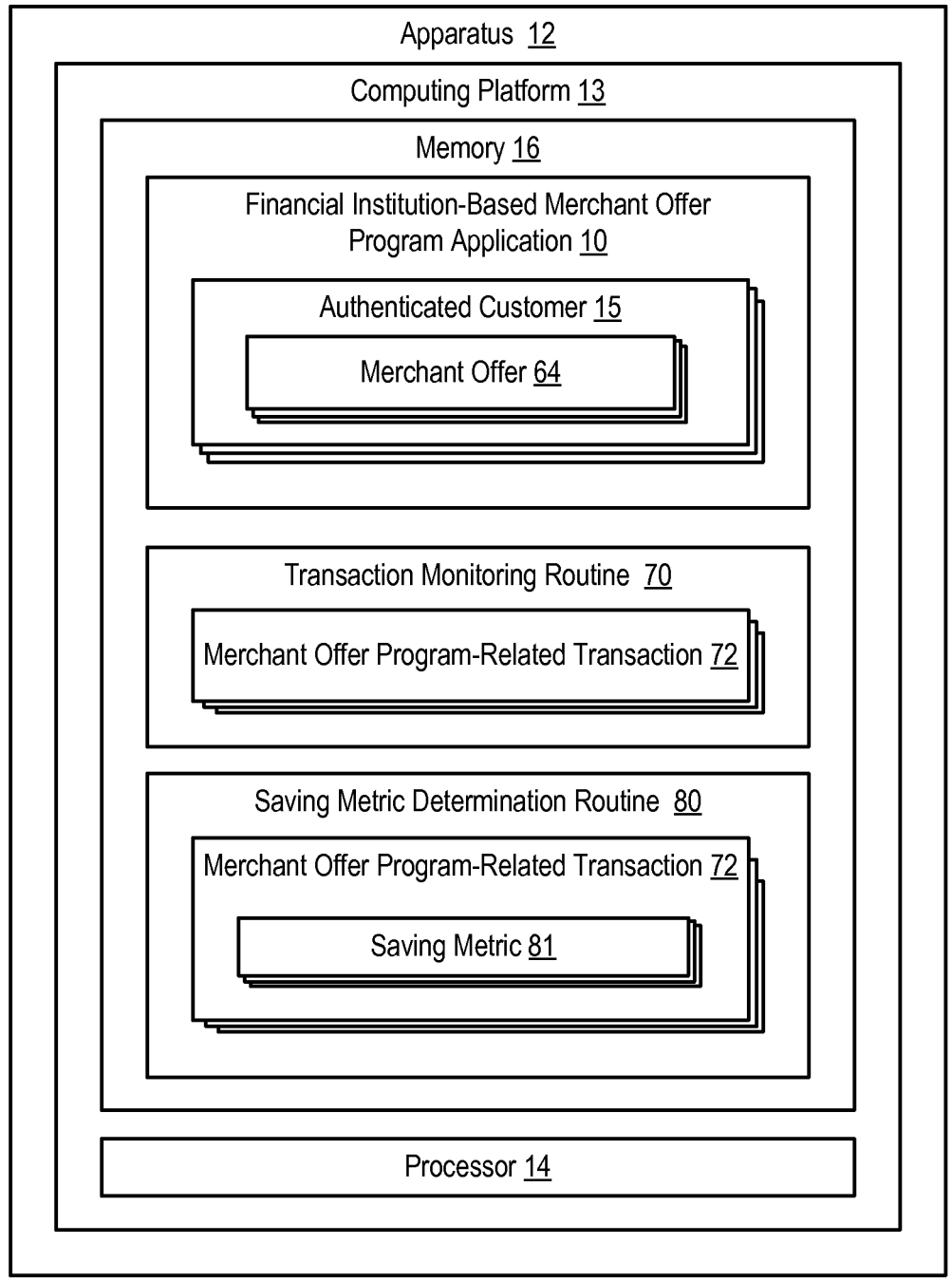
Figure 2:
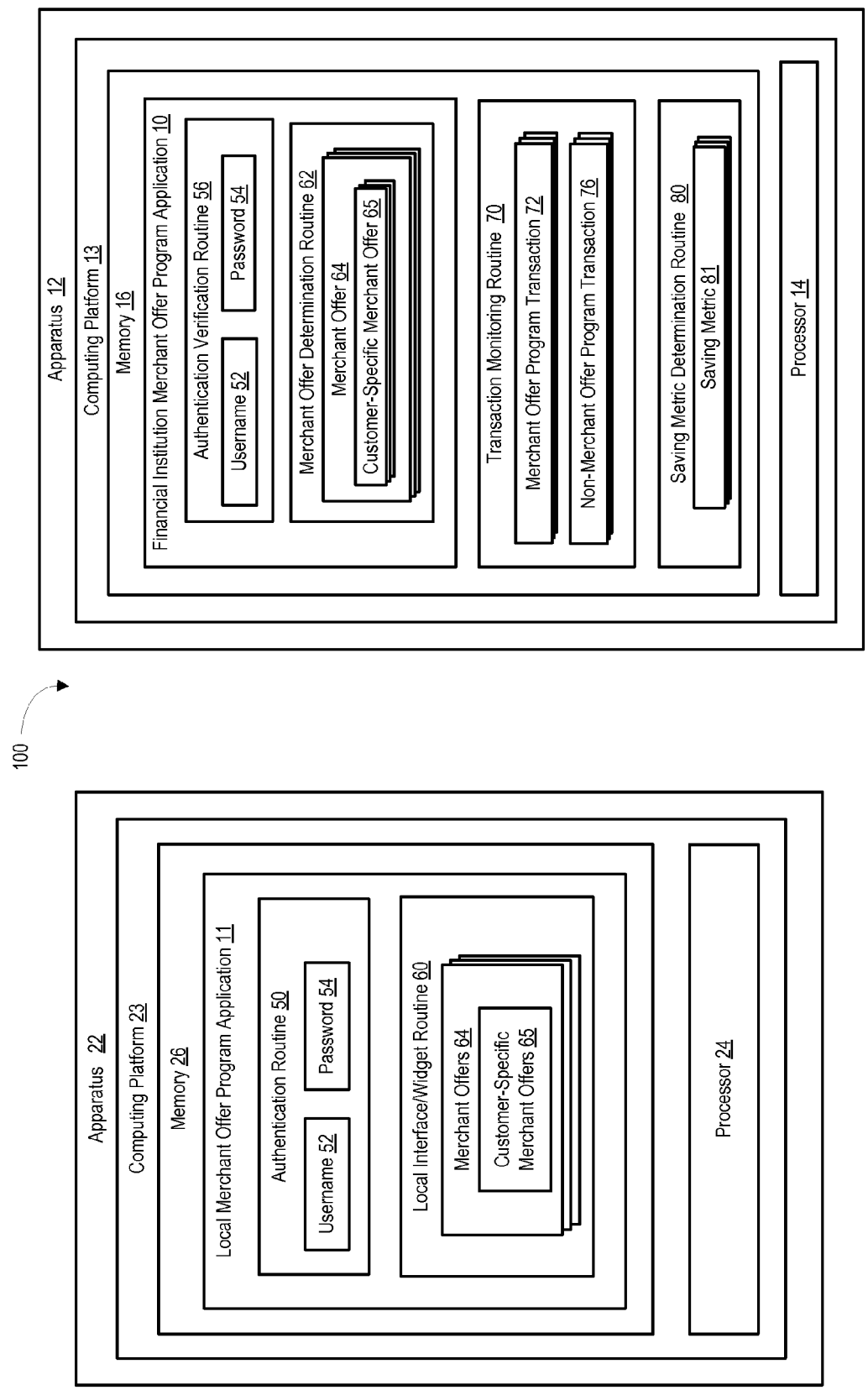
Figure 3:
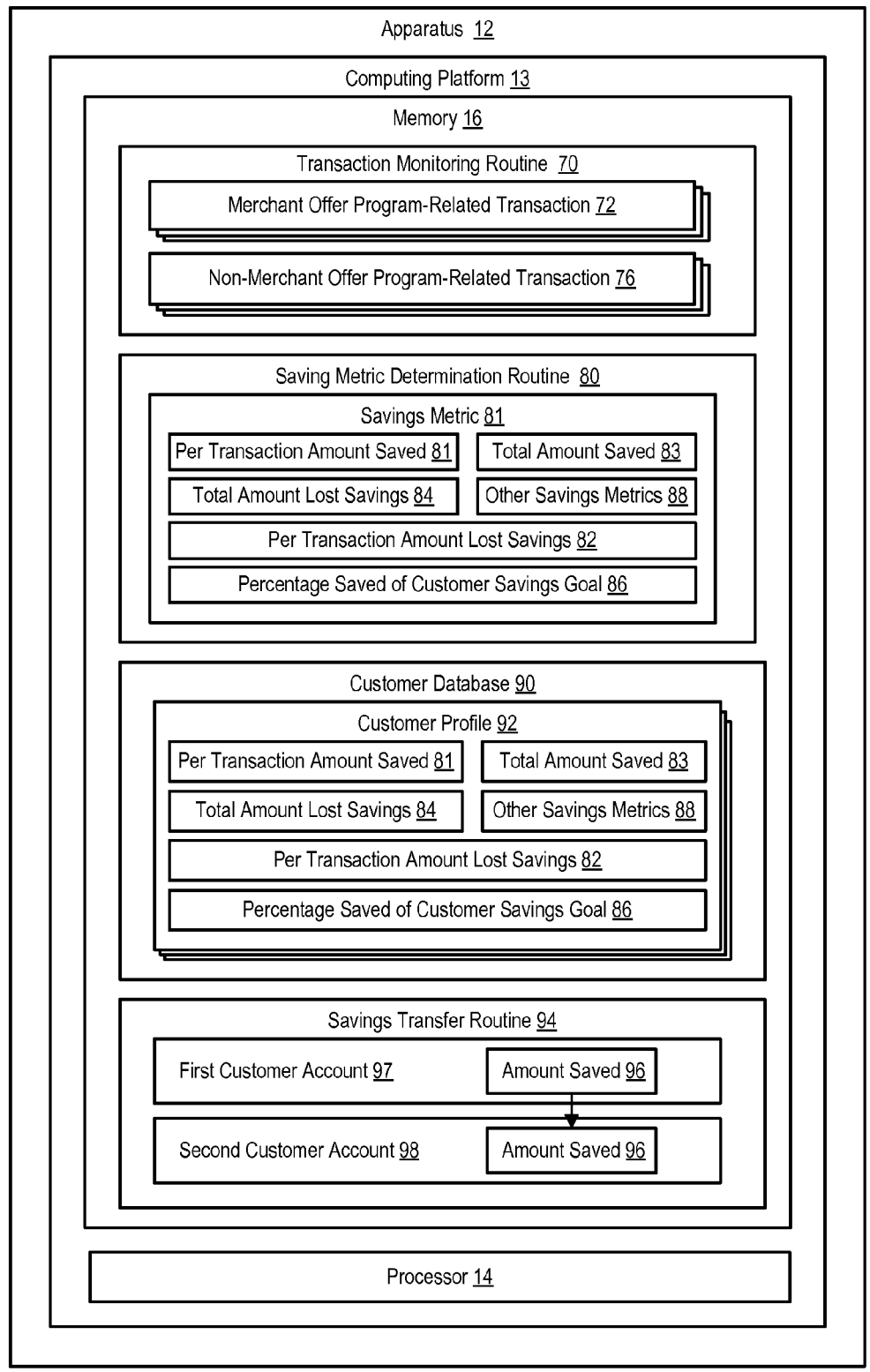
Figure 4:
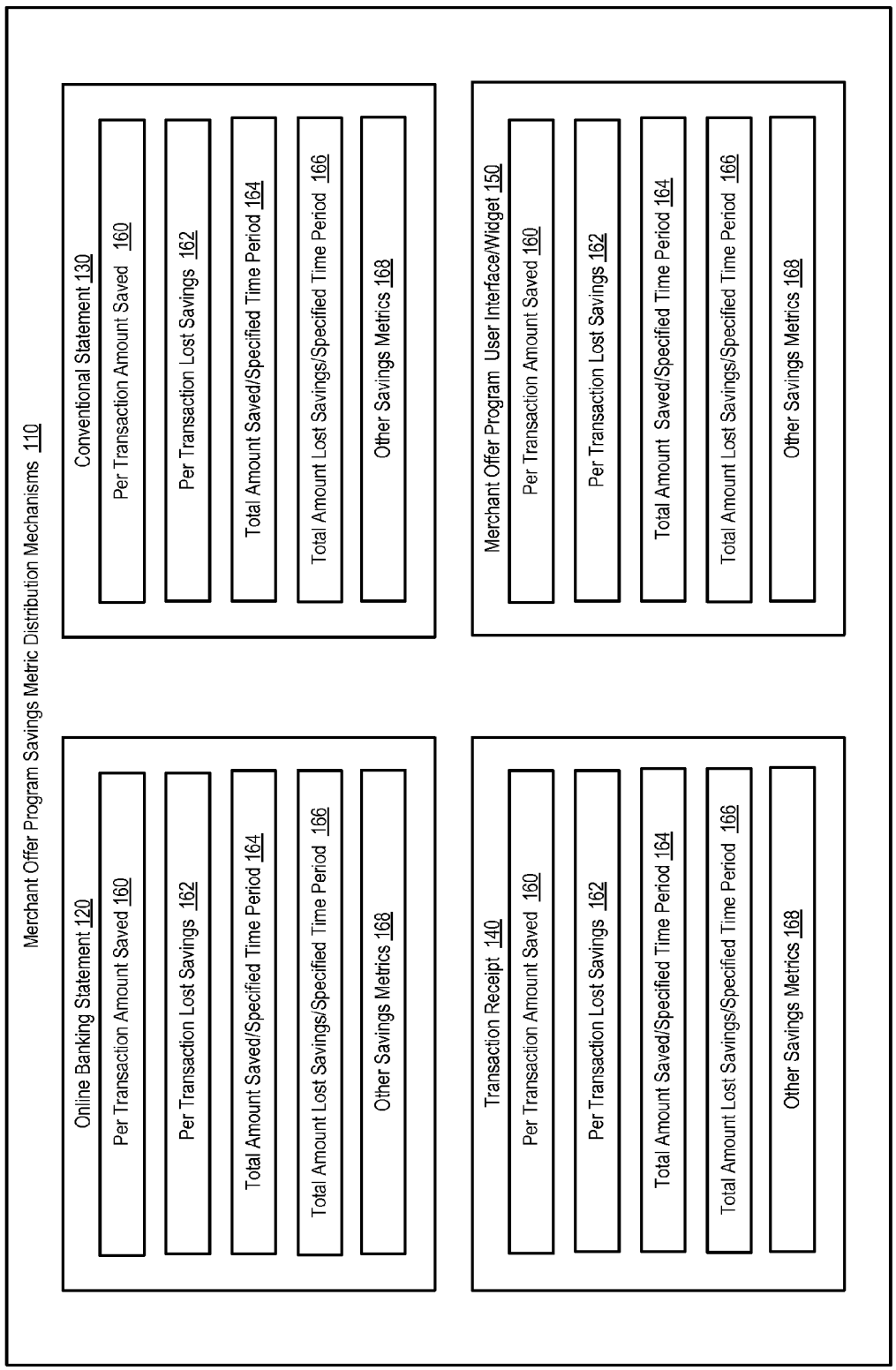
Figure 5:
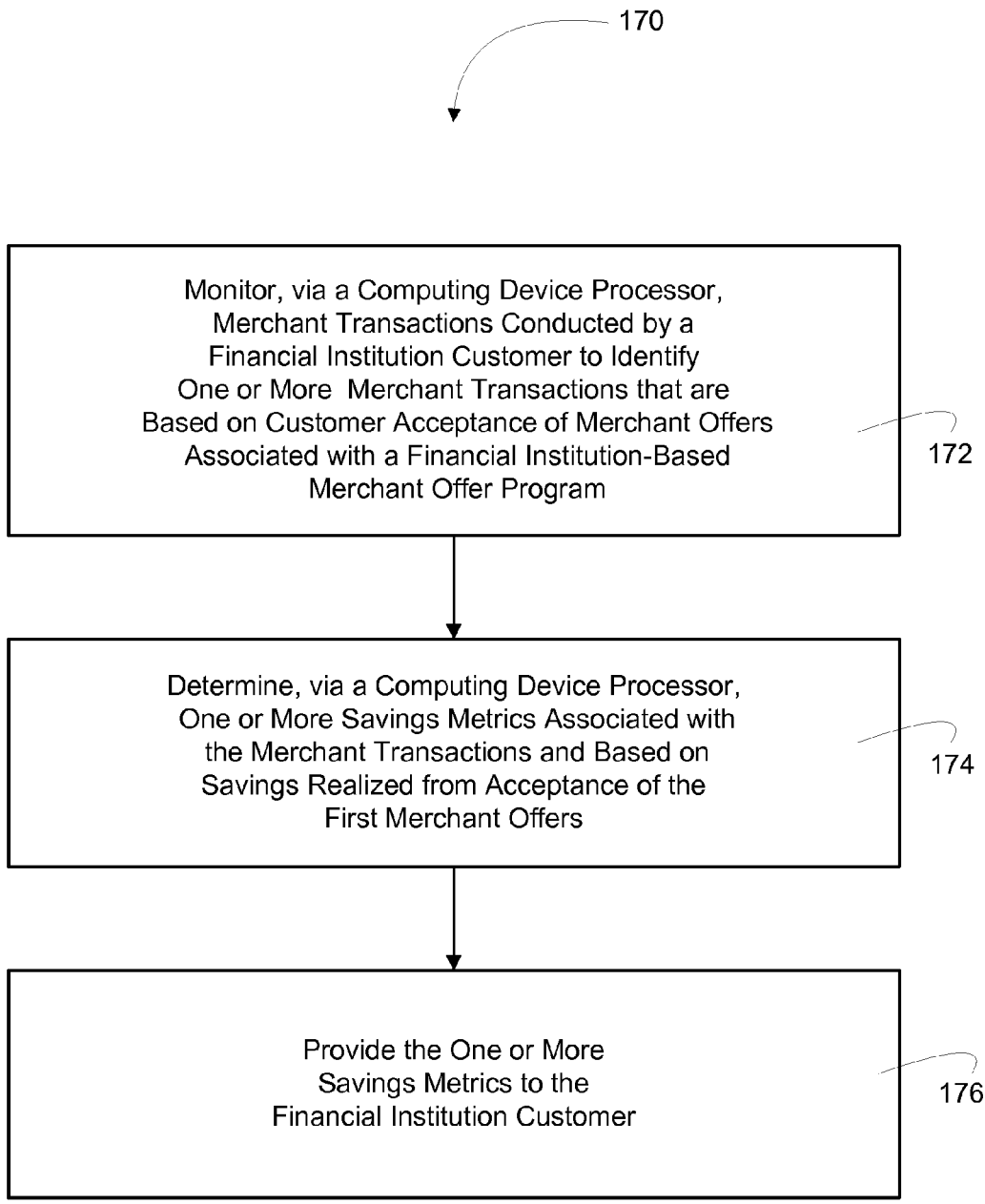
Figure 6:
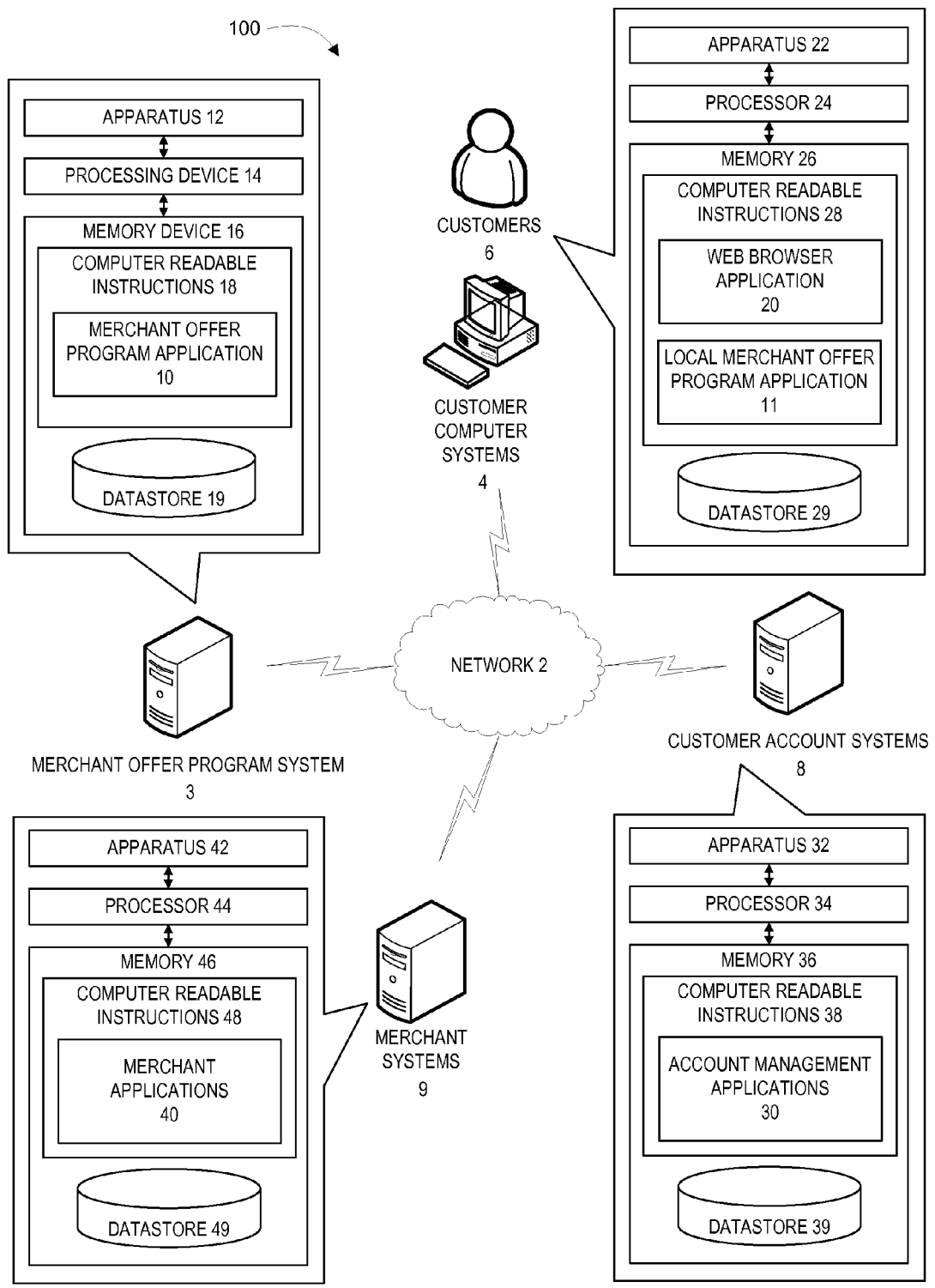
Figure 7A:
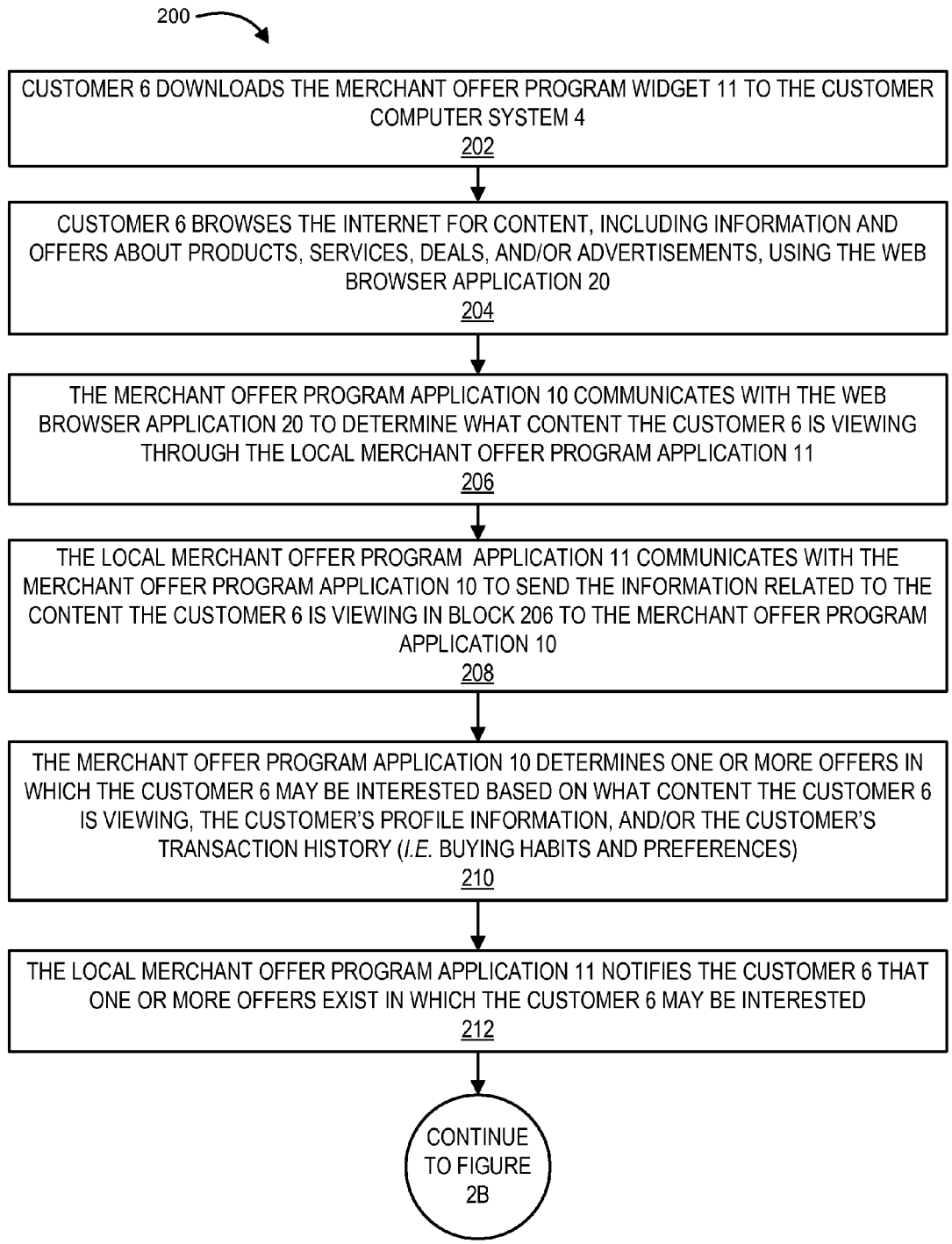
Figure 7B:
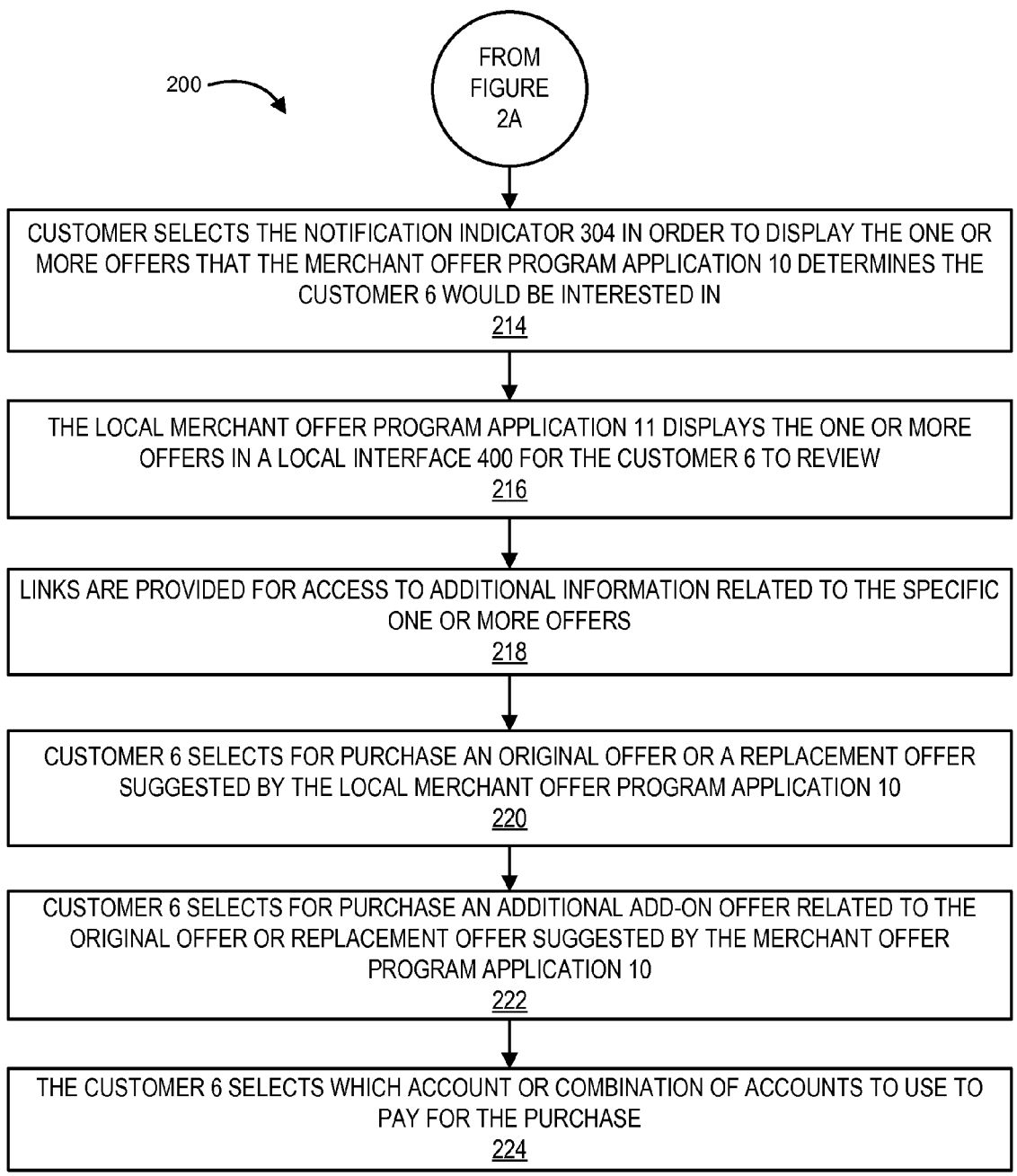
Figure 8:
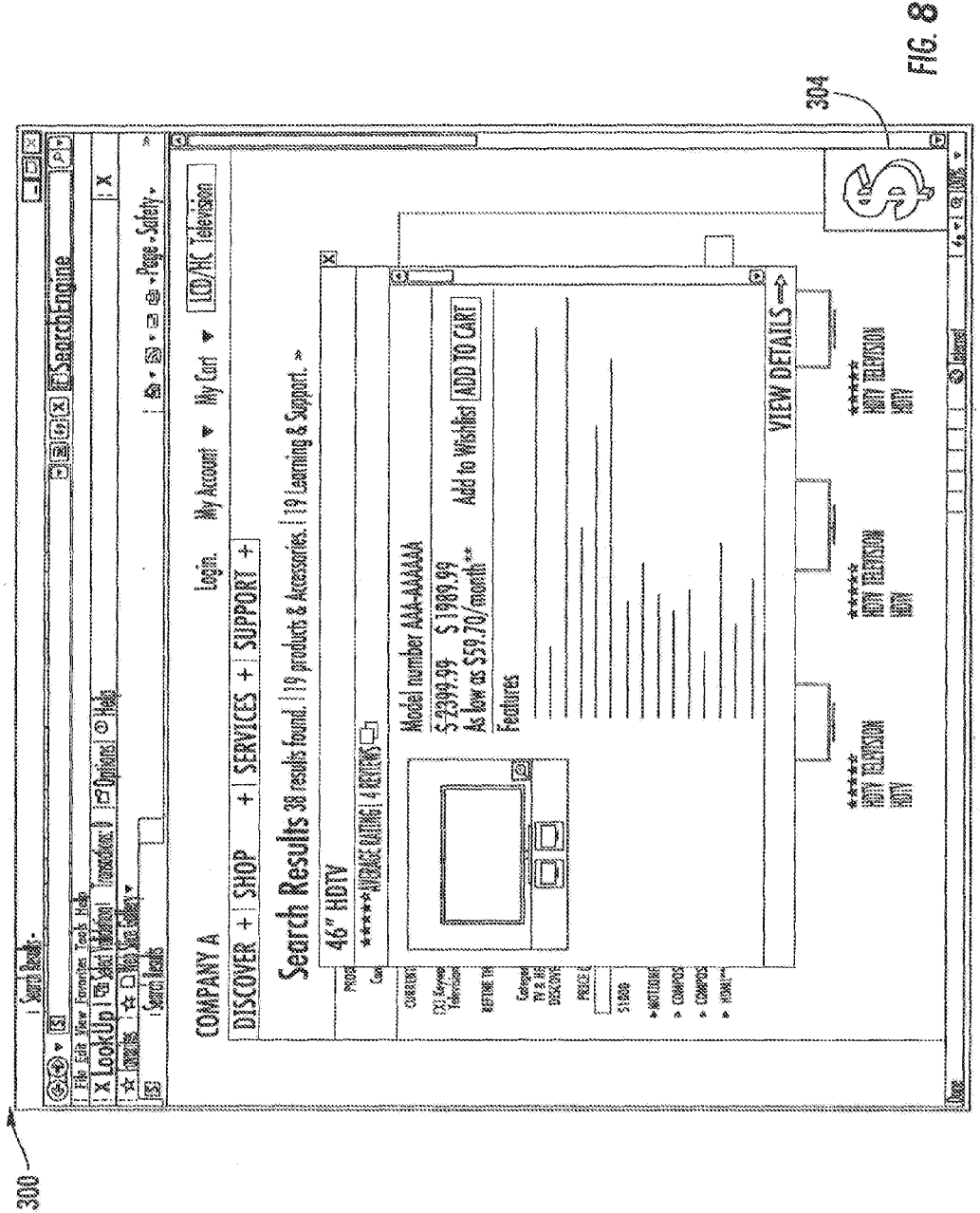
Figure 9:
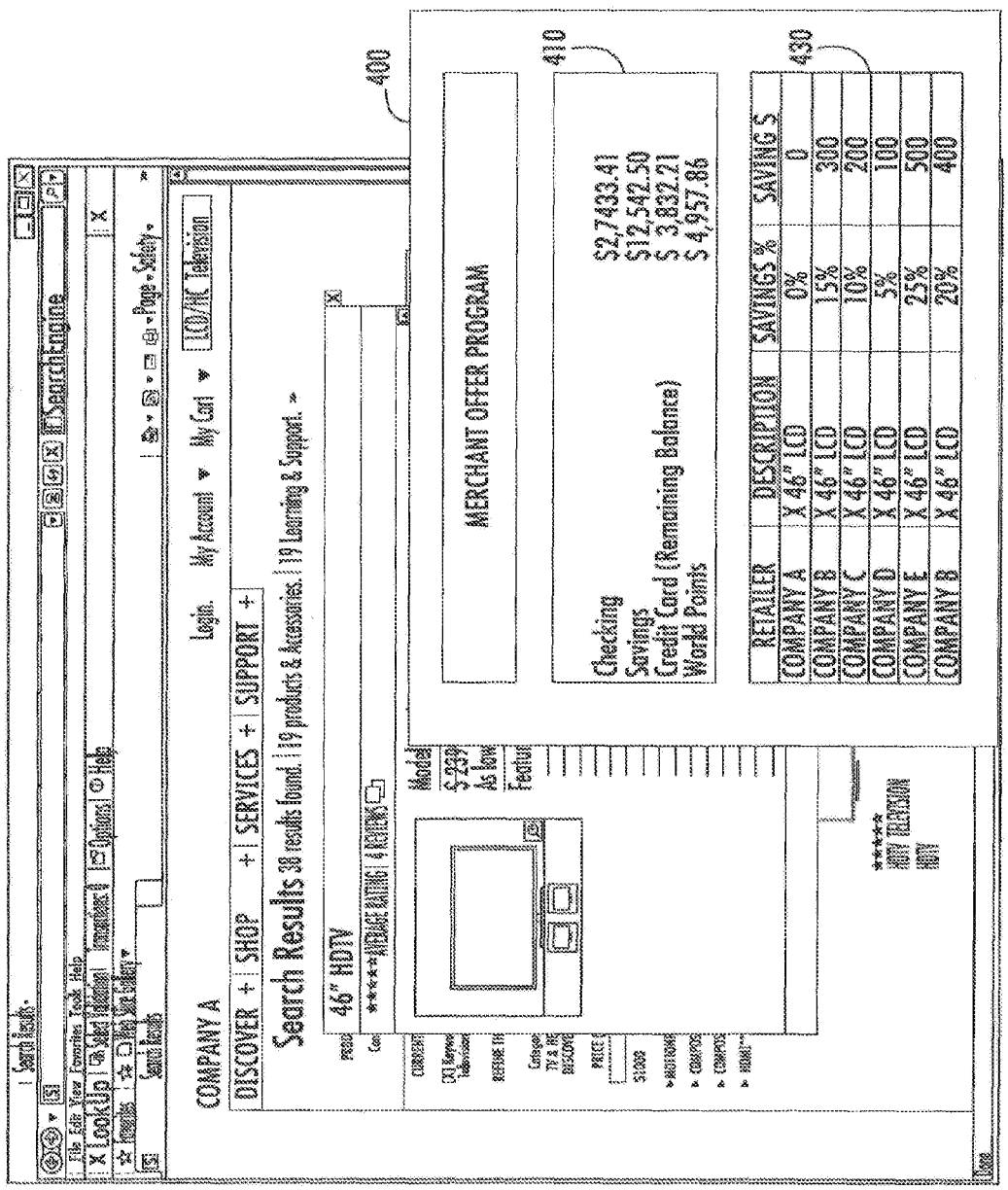
Figure 10:
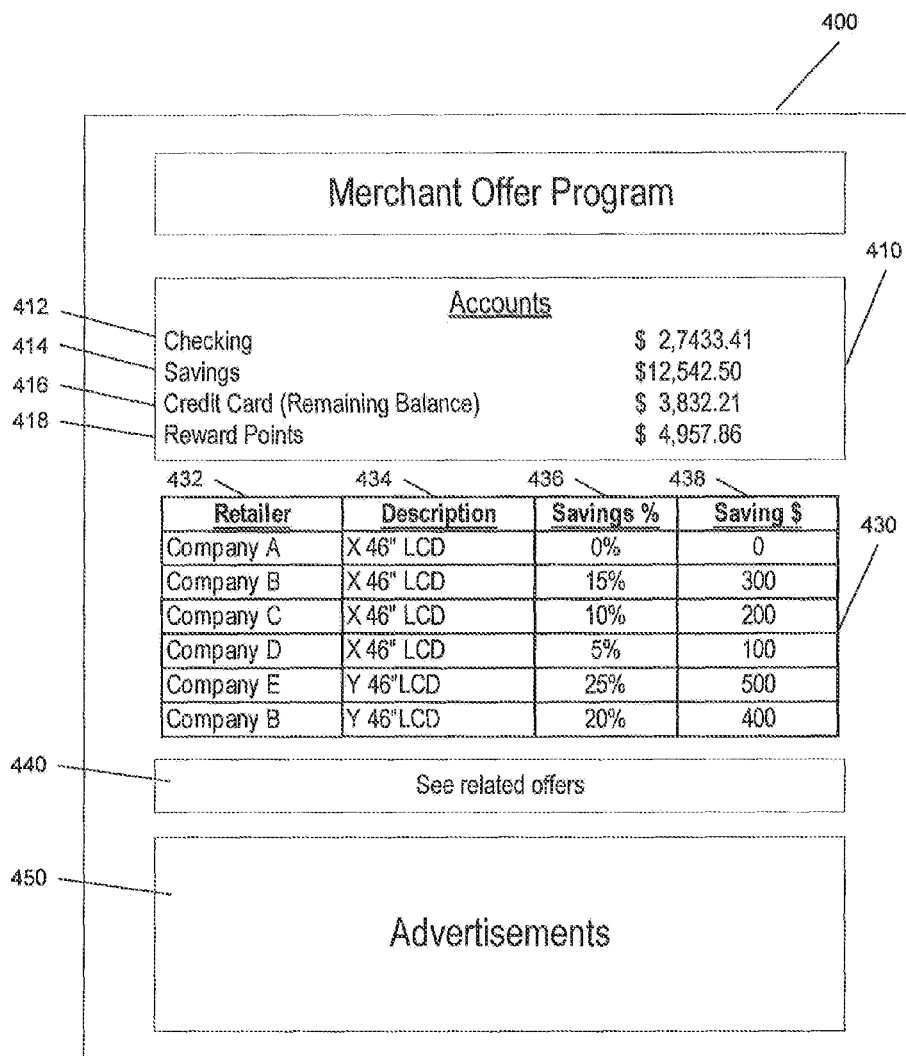

Having thus described embodiments of the invention in general terms, reference will now be made to the accompanying drawings, which are not necessarily drawn to scale, and wherein:

FIG. 1 provides a block diagram illustration of an apparatus configured for monitoring customer transactions associated with a financial institution-based merchant offer program and determining savings metrics for the transactions, in accordance with embodiments of the present invention;

FIG. 2 provides a block diagram illustrating customer and financial institution apparatus for implementing a financial institution-based merchant offer program, in accordance with present embodiments of the invention;

FIG. 3 provides a block diagram illustrating a financial institution apparatus for monitoring customer transactions and providing savings metrics associated with the merchant offer program, in accordance with embodiments of the present invention;

FIG. 4 provides a block diagram illustrating various merchant offer program savings metric output channels, in accordance with embodiments of the present invention;

FIG. 5 provides a flow diagram of a method for monitoring transactions and providing savings metrics associated with a financial institution-based merchant offer program, in accordance with embodiments of the present invention;

FIG. 6 provides a block diagram illustrating a comprehensive financial institution-based merchant offer program environment, in accordance with an embodiment of the present invention;

FIG. 7A provides an integrated online financial banking and customer shopping process, in accordance with an embodiment of the present invention;

FIG. 7B provides a continuation of the integrated online financial banking and customer shopping process, in accordance with an embodiment of the present invention;

FIG. 8 provides a web browser and merchant offer program notification alert, in accordance with an embodiment of the present invention;

FIG. 9 provides a local merchant offer program application interface, in accordance with an embodiment of the present invention; and FIG. 10 provides a local merchant offer program application interface activated by a customer searching the internet, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Small-talk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention provide for systems, devices, apparatus, methods and computer program products for monitoring transactions and providing for savings metrics in association with a financial institution-based merchant offer program. Savings metrics as defined herein include any data related to realized, potential and/or lost savings associated with the financial institution-based merchant offer program. Since transaction monitoring occurs at the financial institution level and the financial institution has access to customer data, including customer transaction data, the savings metrics may include amounts saved by accepting the merchant offers associated with the program and amounts that could have been saved if a merchant offer associated with the program had been accepted. Additionally, the present invention is also capable of determining the type and/or source of future merchant offers associated with the program based on the monitoring of previous transactions.

Referring to FIG. 1 a block diagram is provided of an apparatus 12 configured to monitor customer transaction to identify transactions based on customer acceptance of merchant offers associated with the financial institution-based merchant offer program and to determine savings metrics for the identified transactions, in accordance with embodiments of the present invention. The apparatus 12 includes a computing platform 13 having a processor 14 and a memory 16 in communication with processor 14.

The memory 16 of apparatus 12 stores financial institution-based merchant offer program application 10. The merchant offer program is configured to provide merchant offers 64 to authenticated customers 15. The merchant offer program is "financial institution-based" in that the financial institution has a relationship with the merchants providing the offers and, as such, is able to provide the merchant offers to customers of the financial institution. The financial institution customers are authenticated, either prior to receiving merchant offers or prior to conducting a related transaction, in order to verify their acceptance in the merchant offer program and, in some instance verify their identity. Specific embodiments of exemplary merchant offer programs are discussed in relation to FIG. 2 and FIGS. 6-10, infra.

The memory 16 of apparatus 12 additionally stores transaction monitoring routine 70 that is configured to monitor merchant transactions to identify merchant offer program-related transactions 72 that are based on customer acceptance of merchant offers 64. In specific embodiment the transaction monitoring routine may limit monitoring to merchant transactions associated with merchants participating in the program and/or merchant transactions conducted with authenticated customers 15.

In addition, memory 16 stores saving metric determination routine 80 that is configured to determine one or more saving metrics 81 associated with the merchant offer-program-related transactions 72 and based on savings realized from acceptance of the merchant offers 64. As discussed in detail, infra., the savings metrics may include a total savings amount for a predetermined time period, such as a month, a year or the like, a total savings amount over the life of the merchant savings program and/or a per transaction savings amount.

Referring to FIG. 2 a high level block diagram of a financial institution-based merchant offer program environment 100 in accordance with embodiments of the present invention is illustrated. Additionally, further details associated with an example of a merchant offer program are shown and described in relation to FIGS. 6-10, infra. Environment 100 includes customer apparatus 22 and financial institution apparatus 12. Customer apparatus 22 may comprise any computing device or combination of computing devices, such as personal computer, laptop computer, mobile device, such as personal digital assistant (PDA), automated teller machine (ATM), smart telephone or the like. The financial institution apparatus 12 may comprise any computing device or combination of computing devices, such as servers, mainframe computers, or the like.

The customer apparatus 22 includes a computing platform 23 having at least one processor 24 and a memory 26. The memory 26 includes local merchant offer program application 11 that is configured to provide the financial institution customer with merchant offers based on the financial institution's predetermined relationship with a plurality of merchants. In accordance with specific embodiments of the invention, the local merchant offer program application is customer configurable. Configuration may include specifying which types of offers are to be presented, from which merchants the customer desires offers to be presented, the time of day the customer desires offers to be presented and the like. The local merchant offer program application 11 may be downloaded to apparatus 22, such as via a Intranet or other network connection or otherwise loaded from other computer readable medium, such as a compact disc, flash memory device or the like.

The local merchant offer program application 11 includes authentication routine 50 that is configured to receive from the customer authentication credentials, such as username 52 and password 54 and receive authentication confirmation from a corresponding authentication verification routine 56 executed on financial institution apparatus 12. In alternate embodiments the authentication credentials may be a cookie stored in the memory 26 of apparatus 22 that is automatically communicated to the verification routine 56 upon activation of the device or the like. Thus, authentication routine 50 and corresponding authentication verification routine 56 are configured to verify the identity of the user as a financial institution customer and, more specifically a financial institution customer authorized to participate in the merchant offer program.

In specific embodiments of the invention, the local merchant offer program application 11 may be configured to require customer authentication at the onset of launching the application, i.e., prior to receiving merchant offers. Such configuration, whereby the customer verifies identity prior to receiving merchant offers, may be necessary if the merchant offer program is configured to provide customer-specific offers based on customer attributes, customer profile data, previous customer transactions or the like. In other specific embodiments of the invention, the local merchant offer program application 11 may be configured to require customer authentication prior to accepting an offer or conducting the associated transaction. Such configuration, whereby the customer verifies identity prior to accepting an offer, may be necessary to insure that the customer is an authorized participant in the merchant offer program.

Local merchant offer program application 11 additionally includes local interface routine 60 that is configured to provide a local interface on apparatus 22 for displaying one or more merchant offers 64 to the customer, and more specifically, customer-specific merchant offers 65. The merchant offers 64 are based on a predetermined relationship between the financial institution and the merchant. The local interface may be configured to be displayed or otherwise pop-up based on specific customer actions. For example, if the apparatus 22 is a personal computer and the customer accesses a merchant website on the Internet, the routine 60 may be configured to automatically display the local interface if the financial institution has a predetermined relationship with the merchant and, in some instances, if the financial institution or the merchant are currently offering offers, such as discounts, rebates or the like. In other embodiments in which the apparatus 22 is a portable or mobile computing device and the device is equipped with location determination means, such as Global Positioning Systems (GPS) devices or the like, the presence of the device at or proximate to a physical location of the merchant may cause the routine 60 to automatically display the local interface if the financial institution has a predetermined relationship with the merchant and, in some instances, if the financial institution or the merchant are currently providing offers, such as discounts or the like. In other embodiments of the invention, the local interface may be customer activated and allow for the customer to search for merchant offers by entering a merchant name or some other merchant identifying criteria, such as physical address or the like.

As previously noted, the customer may configure application 11, such that local interface and corresponding merchant offers 64 are displayed or otherwise pop-up only based on customer defined criteria. The customer defined criteria may include product/service type, merchant type, offer type, time of day, week, etc., customer physical location and the like. Thus, customer configuration of the local interface can limit the instances in which the local interface is automatically displayed or otherwise pops-up.

Financial institution apparatus 12 includes computing platform 13 having one or more processors 14 and a memory 16. The memory 16 of apparatus 12 includes financial institution merchant offer program application 10 that is configured to determine merchant offers based on the financial institutions predetermined relationship with specified merchants and provide the merchant offers to the customer via the local interface of the local merchant offer program application 11 executed on customer apparatus 22.

Financial institution apparatus 12 includes previously mentioned authentication verification routine 56 that is configured to receive authentication credentials, such as username 52 and password 54 from authentication routine 50 of local merchant offer program application 11, verify the authentication credentials based on stored authentication data and return authentication confirmation to authentication routine 10. As previously noted, the system may be configured such that customer authentication provides for presentation of merchant offers and/or allows the customer to conduct transactions based on presented merchant offers.

Application 10 also includes merchant offer determination routine 62 configured to determine merchant offers 64 and, more specifically, customer-specific merchant offers 65. Customer-specific merchant offers 65 may be based on any customer information accessible to the financial institution, such as customer profile information, customer affinity information, customer account balances, customer account types, customer transaction information and the like. In addition, the customer-specific merchant offers may be based on dynamic customer information, such as the current physical location of the customer, the current web sites being accessed by the customer or the like. Once the merchant offers are determined by routine 62 they are communicated to application 11 and displayed to the customer via local interface routine 60.

According to specific embodiments of the invention, customer-specific merchant offers 65 may be based on previous customer transactions including both merchant offer program transactions and non-merchant offer program transactions. In this regard, the financial institution has the ability to track and determine previous customer transactions including transactions in which a merchant offer through the program was involved, as well as any other transaction conducted through the financial institution, such as a credit transactions (e.g., a transaction using a financial institution-issued credit card), a debit transaction from a financial institution savings or credit account, checking transactions from a checking account or the like. The customer-specific merchant offers 65 determined based on previous transactions may include, but are not limited to, offers for similar products/service, offers for related products/services and the like.

The memory 16 of apparatus 12 additionally stores transaction monitoring routine 70 that is configured to monitor merchant transactions to identify merchant offer program-related transactions 72 that are based on customer acceptance of merchant offers 64. As previously noted, the identification of merchant offer program-related transactions 72 may be the basis for subsequent customer-specific merchant offers 65.

In addition, transaction monitoring routine 70 may be configured to monitor merchant transactions to identify non-merchant offer program transactions 76. Non-merchant offer program transactions 76 as defined herein are transactions conducted by the authenticated customer in which a relevant merchant offer was available at the time of the transaction but the customer either was unaware of the merchant offer or chose not to accept the offer. Thus, the non-merchant offer program transaction 76 may have been conducted with the merchant that had the offer outstanding or with any other merchant, regardless of their participation in the merchant offer program.

In addition, memory 16 stores saving metric determination routine 80 that is configured to determine one or more saving metrics 81 associated with the merchant offer-program-related transactions 72 and based on savings realized from acceptance of the merchant offers 64. The savings metrics may include a total savings amount for a predetermined time period, such as a month, a year or the like, a total savings amount over the life of the merchant savings program and/or a per transaction savings amount.

In additional embodiments of the apparatus, the savings metric determination routine 80 may be configured to determine savings metrics 81 associated with non-merchant offer program transactions 76. Such non-merchant offer program transactions 76 provide insight into savings lost, i.e., the savings amount the customer could have realized if they had accepted the merchant offer that was outstanding at the time of their non-merchant offer program transaction 76.

FIG. 3 provides a more detailed block diagram illustration of apparatus 12 configured for monitoring customer transaction to identify transactions based on customer acceptance of merchant offers associated with the financial institution-based merchant offer program and determining savings metrics for the identified transactions, in accordance with embodiments of the present invention. The memory 36 stores transaction monitoring routine 70 that is configured to monitor transactions conducted by customers. In monitoring the transactions, routine 70 is configured to identify merchant offer program related transactions 72 (i.e., transactions in which the customer accepted the merchant offer). In addition, routine 70 may be configured to identify non-merchant offer program transactions 76, in which a merchant offer was available but not accepted by the customer. In such instances, the customer may have declined the offer or the customer may have been unaware of the existence of the offer.

As previously noted, financial institutions have access to customer transaction information including, but not limited to, credit transactions (e.g., a transaction using a financial institution-issued credit card), a debit transaction from a financial institution savings or credit account, a check transaction from a financial institution checking account or the like and, therefore, can identify previous transactions, based on product/service type or the like. As such the transaction monitoring routine 70 can identify which customer transactions occurred without the benefit/savings of a merchant offer that was available at the time of the transaction. It should be noted that in some instances the customer may have been presented the merchant offer and chose to forego the offer or, in other instances, the customer may have been unaware at the time of the transaction that an offer existed (e.g., a transaction at a retail location in which the customer was not in possession of a mobile device executing the local merchant offer program application 11).

Memory 16 of apparatus 12 additionally stores saving metric determination routine 80 configured to determine one or more savings metrics 81 associated with merchant offer program transactions 72 and non-merchant offer program transactions 76. In this regard, the saving metric determination routine 80 may be configured to determine a per transaction amount saved 81 for merchant offer program-related transactions 72 and a per transaction amount lost savings 82 for non-merchant offer program-related transactions 76. The per transaction amount lost savings 82 is the amount that the customer could have saved defined as the difference between the transaction price and the merchant offer price.

In addition, the savings metrics may include total amount saved 83 for merchant offer-program-related transactions 72 and total amount lost savings 84 for the non-merchant offer program-related transactions 76. The total amount saved and/or lost savings may be a cumulative total of all offers accepted over the life of the program and/or the total amount may be for a predetermined time period, such as a month, a year or the like.

In addition, saving metric determination routine 80 may be configured to determine percentage saved 86 by accepting merchant offers in relation to a customer's predefined savings goal. In such embodiments, the savings metric determination routine 80 may be in communication with customer profiles or other customer data records that indicate the customer's predefined savings goal. Additionally, the savings metric determination routine 80 may be configured to determine other savings metrics 88 as defined by the financial institution or as configured by the customer based on the needs of the customer.

Memory 16 additionally stores customer database 90 that includes a plurality of customer profiles 92. In addition to storing personal data, account data, affinity data and any other data related to the customer, customer profile 90 stores savings metric data, including, but not limited to, per transaction amount saved 81, per transaction amount lost savings 82, total amount saved 83, total amount lost savings 84, percentage saved of customer's savings goal 86 and other savings metric (s) 88.

In addition, memory 16 may store savings transfer routine 94, which may be configured by the customer to transfer all or a portion of the amount saved 96 by accepting a merchant offer from a first customer account 97, such as a checking account or other account into a second customer account(s) 98, such as savings account, brokerage account or any other account. The routine 94 may provide for customer/configuration such that savings transfers occur based on specified criteria and/or thresholds, such as savings above/below a specified amount, savings above/below a specified savings percentage, minimum/maximum balances in the designated transfer account and the like.

Referring to FIG. 4 a block diagram is presented of various distribution mechanisms 110 for communicating the merchant offer program savings metrics to the customer, in accordance with embodiments of the present invention. It should be noted that the distribution mechanisms 110 shown in FIG. 4 are by way of example only; other distribution mechanisms may be used and are within the inventive concepts herein disclosed. The distribution mechanisms include online banking statement 120, conventional statement 130, transaction receipt 140 and merchant offer program local interface 150. Each of the distribution mechanism 110 may include one or more savings metrics; including, but not limited to, amount per transaction savings amount 160, per transaction amount lost savings 162, total savings amount over a specified time period 164, total lost savings amount over a specified time period 166 and/or other savings metrics 168.

In accordance with specific embodiments of the invention, online banking statement 120 can be updated in real-time or near-real time fashion to reflect transactions that have just occurred and posted to the respective account. In this regard, once a transaction has occurred and posted to an account, online banking statement 120 indicates the per transaction savings amount 160 for the previous transaction in which a merchant offer was presented and accepted and/or the per transaction amount lost savings 162 for the previous transaction in which an offer was available but not accepted. In addition, the online banking statement 120 may include the total amount saved 164 and the total amount lost savings 166 for a specified time period; for example, a month, a year or the like, and/or over the life of the customer's participation in the program, as well as, other savings metrics 168.

The conventional statement 130 is typically mailed, postal or electronically, to a customer on a recurring basis, such as monthly or the like. The conventional statement 130 indicates a listing of transactions that occurred during the previous statement period and provides for identification of those transaction in which a merchant offer was used/accepted and the amount the customer saved 160. Additionally, the listing of transactions identify those transactions in which a merchant offer was available but was not used and the associated amount lost savings 162 if the merchant offer had been accepted. In addition, the conventional statement 130 may include the total amount saved 164 and the total amount lost savings 166 for a specified time period; for example, a month, a year or the like, and/or over the life of the customer's participation in the program, as well as, other savings metrics 168.

The transaction receipt 140 may be an online transaction receipt or, if the transaction occurs at a physical retail location, the transaction receipt may be a printed hard-copy receipt. If the transaction included use of a merchant offer, the transaction receipt 130 indicates the per transaction savings amount 160. If the transaction did not include use of a merchant offer but a merchant offer was available, the transaction receipt indicates the per transaction amount lost savings 162 if the merchant offer was accepted. In addition, the transaction receipt 130 may include the total amount saved 164 and the total amount lost savings 166 for a specified time period; for example, a month, a year or the like, and/or over the life of the customer's participation in the program, as well as, other savings metrics 168.

Merchant offer program local interface 150 may be configured to present savings metrics in real-time. In this regard, once a transaction associated with an accepted merchant offer occurs, the local interface 150 may display, shortly after the transaction occurs, the per transaction amount saved 160. Similarly, once a transaction occurs in which a merchant offer was available but not used, the local interface 150 may display, shortly after the transaction occurs, the per transaction amount lost savings 162. In addition, the local interface 150 may display a the total amount saved 164 and the total amount lost savings 166 for a specified time period; for example, a month, a year or the like, and/or over the life of the customer's participation in the program. Moreover, the local interface 150 may be configured to display potential saving prior to conducting a transaction associated with a merchant offer. Potential savings provides the customer with a product/service to consider, based on an outstanding merchant offer/discount, before making the purchasing decision. In addition, the local interface may be configured to display other savings metrics 168.

FIG. 5 is a flow diagram of a method 170 for providing customer savings metrics associated with a merchant offer program, in accordance with an embodiment of the invention. At Event 172, merchant transactions are monitored by a financial institution that is implementing a merchant offer program. The merchant transactions are monitored to identify one or more transactions that are based on customer acceptance of a merchant offer associated with a financial-institution based merchant offer program. As previously noted, the financial institution has a predetermined relationship/agreement with a plurality of merchants whereby the financial institution can offer its customers a merchant offer, such as discount or the like. It should be noted that the monitoring of transactions may include the monitoring of all transactions incurred by the merchant and not just those transactions in which a merchant offer is involved.

At Event 174, one or more savings metrics are determined. The savings metrics are associated with the identified merchant transactions and are based on savings realized from acceptance of the merchant offer. As previously noted the savings metrics may include, but are not limited to, the amount saved per transaction based on acceptance of a merchant offer, the amount lost savings transaction, the total amount saved, the total amount lost savings, the percentage saved of a customer's savings goal and the like.

At Event 176, the one or more savings metrics are provided to the customer associated with the metrics. As previously noted, the savings metrics distribution/communication mechanism may include, but is not limited to, an online banking statement, a conventional bank statement, a transaction receipt, and display via the local interface.

FIG. 6 illustrates a comprehensive financial-institution-based merchant offer program environment 100 in accordance with an embodiment of the present invention. As illustrated in FIG. 6, the financial institution-based merchant offer system 3 is operatively coupled, via a network 2, to one or more customer computer systems 4 of one or more customers 6, the financial institution's customer account systems 8, and the merchant systems 9, as well as other systems at a financial institution, such as systems that maintain and administer customer accounts, which are not shown. In this way, a customer 6 located at the customer computer system 4 can receive information from and send information to the merchant offer application 10 located on the financial institution-based merchant offer system 3 through a local merchant offer application 11 and/or a web browser application 20, located on the customer computer system 4 through the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between devices in the network.

As illustrated in FIG. 6, the financial institution-based merchant offer system 3 generally includes a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, the customer computer systems 4, the customer account systems 8, and/or the merchant systems 9, as well as other systems within the financial institution that are not shown. As such, the communication device 12 generally comprises a modem, server, or other device for communicating with other devices on the network 2.

As further illustrated in FIG. 6, the financial institution-based merchant offer system 3 includes computer-readable instructions 18 stored in the memory device 16, which in one embodiment include the computer-readable instructions 18 of a merchant offer application 10. In some embodiments, the memory device 16 includes a datastore 19 for storing data related to the financial institution-based merchant offer system 3, including but not limited to data created and/or used by the merchant offer application 10.

As discussed later in greater detail, in one embodiment, the merchant offer application 10 stores or receives customer profile data and data related to offline and online transactions from the account management applications 30. The merchant offer application 10 receives data related to customer browsing behavior and returns targeted offers to the customer 6. Offers include but are not limited to products, services, discounts, coupons, promotions, add-on sales, upsells, rebates, advertisements, marketing information, etc.

As illustrated in FIG. 6, the customer computer systems 4 generally include a mobile communication device 22, a processing device 24, and a memory device 26. The processing device 24 is operatively coupled to the mobile communication device 22 and the memory device 26. The processing device 24 uses the mobile communication device 22 to communicate with the network 2, and other devices on the network 2, such as, but not limited to, the financial institution-based merchant offer system 3, customer account systems 8, and/or merchant systems 9, as well as other financial institution systems not shown. As such, the mobile communication device 22 generally comprises a modem, server, or other device(s) for communicating with other devices on the network 2, and a display, keypad, mouse, keyboard, microphone, and/or speakers for communicating with one or more users. The devices in the network can be personal computers, personal digital assistants ("PDA"), smart phone, cell phones, etc.

As further illustrated in FIG. 6, the customer computer systems 4 comprise computer-readable program instructions 28 stored in the memory device 26, which in one embodiment includes the computer-readable instructions 28 of the local merchant offer application 11 and a web browser application 20. In some embodiments, the memory device 26 includes a datastore 29 for storing data related to the customer computer systems 4, including but not limited to data created and/or used by the local merchant offer application 11 and/or the web browser application 20.

In one embodiment of the invention, the local merchant offer application 11 is the part of the merchant offer application 10 that resides on the customer computer systems 4. The local merchant offer application 11 assists in monitoring websites that the customer 6 is browsing through the web browser application 20 by monitoring and sending the information related to the customer's web browsing to the merchant offer application 10. In other embodiments of the invention there is no local merchant offer application 11, as such the merchant offer application 10, which is located on the financial institution's databases, performs the functions of the local merchant offer application 11 and, thus can interact directly with the web browser application 20 located on the customer computer systems 4. In other embodiments of the invention there is no local merchant offer application 11, as such the merchant offer application 10, which is located on the customer computer system 4, performs the functions of the local merchant offer application 11. In still other embodiments of the invention the local merchant offer application 11 is a separate application, which is located on the customer computer system 4, that works in conjunction with the merchant offer application 10.

Throughout this application the local merchant offer application 11 is described as the part of the merchant offer application 10 that resides on the customer computer systems 4; however, it is to be understood that the apparatuses and methods described herein would work equally well in the various embodiments of the merchant offer application 10 and local merchant offer application 11 described above. Regardless of the configuration, the local merchant offer application 11 displays offers, determined by the merchant offer application 10, related to what the customer is searching to the customer 6 on an interactive graphical user interface (i.e. local interface 400). The offers can be, among other things, based in part on the data stored by the merchant offer application 10 and the customer account systems 8, including but not limited to customer profile data and transaction history.

As illustrated in FIG. 6, the customer account systems 8 generally include a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the merchant offer system 3, the customer computer systems 4, and/or the merchant systems 9, as well as other systems at the financial institution not shown. As such, the communication device 32 generally comprises a modem, server, or other device(s) for communicating with other devices on the network 2.

As further illustrated in FIG. 6, the customer account systems 8 comprise computer-readable program instructions 38 stored in the memory device 36, which in one embodiment includes the computer-readable instructions 38 of account management applications 30. In some embodiments, the memory device 36 includes a datastore 39 for storing data related to the customer account systems 8, including but not limited to data created and/or used by the account management applications 30.

The account management applications 30, in one embodiment, are used to store, process, and monitor the transactions, including but not limited to, deposits, withdrawals, transfers, and payments, made through various customer accounts, such as, but not limited to, checking, savings, credit card, hybrid, deposit, credit line, money market, equity line, investment, bill payment, transfer, etc. accounts. The account management applications 30 have the transaction history information for each of the financial institution's customers, in some cases, for as long as the customer's have had accounts with the bank. The transactions history information located in the account management applications is searchable and sortable over different ranges of time. The transaction information in the account management applications 30 is used by the merchant offer application 10, along with other information or alone, to determine what targeted offers and marketing information should be sent to customers 6. In some embodiments of the invention, the account management applications 30 include online financial banking applications, such as an online banking website, which allow a customer 6 to access the customer's accounts through the Internet.

As further illustrated in FIG. 6 the merchant systems 9 generally include a communication device 42, a processing device 44, and a memory device 46. The processing device 44 is operatively coupled to the communication device 42 and the memory device 46. The processing device 44 uses the communication device 42 to communicate with the network 2, and other devices on the network 2, such as, but not limited to, the merchant offer system 3, customer computer systems 4, and/or customer account systems 8, as well as other systems at the financial institution not shown. As such, the communication device 42 generally comprises a modem, server, or other device(s) for communicating with other devices on the network 2, and a display, keypad, mouse, keyboard, microphone, and/or speakers for communicating with one or more users.

As further illustrated in FIG. 6, the merchant systems 9 comprise computer-readable program instructions 48 stored in the memory device 46, which in one embodiment includes the computer-readable instructions 48 of merchant applications 40. In some embodiments, the memory device 46 includes a datastore 49 for storing data related to the merchant systems 9, including but not limited to data created and/or used by the merchant applications 40.

The merchant applications 40, in one embodiment, are used to generate, store, process, and/or monitor the offers made directly to customer computer systems 4 over the network 2 or indirectly though the merchant offer system 3.

In other embodiments of the invention, the merchant offer environment 1 will include other systems in the financial institution that are connected over the network 2. In some embodiments of the invention, the other systems within the financial institution could include transaction processing systems such as check image processing, or online account processing systems. These other systems can work in conjunction with the merchant offer system 3, or supplement and/or enhance the merchant offer system 3.

FIGS. 7A and 7B illustrate one embodiment of an integrated online payment and customer shopping process 200 that describes how a customer 6 utilizes the merchant offer environment 1 to search for offers on the Internet or in retail stores, receive offers related to the offers the customer 6 is searching, receive offers related to web-based content that the customer is accessing, and accept one or more of the offers using various forms of payment. In order to utilize the merchant offer environment 1 the customer 6, in some embodiments, downloads the local merchant offer application 11 to the customer computer system 4, as illustrated in block 202 of FIG. 7. In some embodiments the customer computer system 4 is a computer, such as a laptop, desktop, or tablet computer, Internet television, or other electronic or digital medium device, in other embodiments the customer computer system 4 may be a mobile device, such as a PDA, cell phone, smart phone, Internet-only computer, or any other device that has Internet browsing capability.

Once the local merchant offer application 11 is downloaded to the customer computer system 4, in some embodiments it will run by communicating constantly with the merchant offer application 10 located on the merchant offer system 3. In other embodiments, the customer 6 has the ability to turn the merchant offer application 10 on and off. In still other embodiments of the invention, the customer 6 will be required to authenticate herself as the customer before using the local merchant offer application 11 and merchant offer application 10. Authentication is required in some embodiments, when the merchant offer application 10 communicates with the customer's private customer account information located on the customer account systems 8 at the financial institution. As explained in greater detail below, the merchant offer application 10 accesses the customer's account information in order to display to the customer 6, through the local merchant offer application 11, the customer's balances for the accounts that the customer can use to pay for purchases made through the merchant offer environment 1. Moreover, when the customer 6 makes a purchase through the merchant offer application 10, the merchant offer application 10 accesses the customer's account through the customer's online banking accounts and/or the customer account systems 8 in order to make real-time or near real-time transactions between the customer 6 and the merchant.

The customer 6 in some embodiments may perform the authentication when downloading the local merchant offer application 11, when the customer 6 wants to use the local merchant offer application 11, or only when the customer 6 decides to make a purchase. Generally, in exemplary embodiments, the local merchant offer application 11 runs on the customer computer system 4 at all times, and the customer only authenticates herself when the customer wants to view the identified offers or purchase something through the offers supplied by the merchant offer application 10.

As illustrated in block 204 of FIG. 7A, the customer 6 searches the Internet for content, such as products or services or other information located on websites. For example, as illustrated in FIG. 8, the customer 6 may be searching for a forty-six inch LCD television made by Brand "X". Block 206 in FIG. 7A illustrates that as the customer 6 is searching for a particular product (i.e. the Brand "X" TV), the merchant offer application 10 communicates with the web browser application 20 that the customer is using, in order to determine what offers or other content the customer 6 is viewing through the web browser application 20. As illustrated in block 208 in FIG. 7A the local merchant offer application 11 transfers the information related to the content the customer is viewing back to the merchant offer application 10.

In other embodiments of the invention, the customer 6 does not have to search the Internet for offers in order for the merchant offer application 10 to gather information related to offers in which the customer 6 is interested. For example, if the local merchant offer application 11 is downloaded on a mobile device, such as a PDA, cell phone, smart phone, etc., the local merchant offer application 11 can relay information to the merchant offer application 10 about the physical location of the customer through location determining devices, such as global positioning satellite ("GPS") or radio frequency ("RF") locator systems in the mobile device. The merchant offer application 10 can then provide offers or information that are relevant to the customer's physical location, such as offers applicable to the store in which the customer is located, offers at other stores in close proximity, offers that can be purchased over the mobile device, etc.

In other embodiments of the invention, the customer 6 can use the mobile device to identify information related to an offer at a physical store. For example, information about a product can be captured by capturing an image of the product, scanning an identifier (i.e. barcode or UPC number) located on the product into the mobile device, and/or entering an identifier or keyword related to a product or service through a keyboard or voice command. The merchant offer application gathers the information related to the offer through the local merchant offer application 11, which, as explained in greater detail below, provides the customer 6 with related offers or information on the customer's mobile device.

In some embodiments of the invention, a customer can use a mobile device to make a purchase through the actual point-of-sale applications at the store in which the customer is located. In some embodiments of the invention, a mobile device that is configured with a payment system, such as a near field communication ("NFC") payment system or other payment system, can use the system to make a purchase through local merchant offer application 11 downloaded on the mobile device. The purchase, in some embodiments, takes into account real time discounts, e-Coupons, etc. available through the merchant offer application 10, as discussed in further detail later. The customer's account can be updated in real-time or near real-time to reflect the most recent transactions using a mobile device for payment.

After receiving information related to what offers or other content the customer 6 is currently viewing or searching, in some embodiments, the merchant offer application 10 analyzes the customer's past transaction purchasing history, and the customer's profile information to determine one or more offers to present to the customer 6 through the local merchant offer application 11, as illustrated by block 210 in FIG. 7A. The merchant offer application 10 analyzes the customer's past purchasing history and the customer's profile information, in part, from the account management applications 30, which store the histories of purchases made by the customer online and offline (i.e. brick and mortar stores).

In some embodiments of the invention, the financial institution may have a relationship with other financial institutions, credit card providers, Internet shopping services, etc., in order to gather more transactional data related to the customer's purchase history when the customer 6 makes transactions with other business accounts, credit cards, etc., in addition to the data that the financial institution maintains. In other embodiments the customer 6 can upload the transaction histories of transactions made with other financial institution accounts, credit cards, etc. by authorizing the financial institution to reach out and pull (or be pushed) data related to transactions from other accounts. For example, the customer 6 can provide the financial institution the account number and password to other online financial banking systems, online credit card statements, etc. and the financial institution can pull transaction information from those accounts. This additional information can be also be used to provide the customer 6 more payment options, from outside accounts, to use in completing the transaction.

In other embodiments of the invention the customer can log onto the customer's own merchant offer account in the merchant offer application 10, or other account management application 30 to provide or enter customized profile information. For example, the customer 6 can request specific types of offers, such as specific products or services, discounts, or advertisements in which the customer 6 is interested on a wish list, which is explained in further detail below. In other embodiments of the invention the customer 6 can provide profile information, which allows the merchant offer application 10 to provide more personalized offers to each individual customer 6. For example, the profile information could include, but is not limited to, places the customer 6 likes to shop, hobbies in which the customer is interested, specific offers or merchants from whom the customer 6 does or does not want to receive offers from, etc.

The offers identified by the merchant offer application 10 in block 210 and provided to the customer 6 through local merchant offer application 11, are determined in a number of ways. In exemplary embodiments, the financial institution will have in place arrangements with merchants that allow the financial institution to provide certain products or services to customers through the merchant offer application 10 at discounted prices. The financial institutional will display the various products or services that are the subject of a discount coupon, rebate, etc. The products and services will normally be displayed with the items carrying the greatest discount, coupon, rebate, etc., first. The discount, coupon, rebate, etc. can be the merchant's normal offer or can be the subject of a separate arrangement with the financial institution. In other embodiments, the merchant may pay a fee to the financial institution per month, week, etc., or a flat fee, etc., in exchange for the financial institution showing one or more of the merchant offers to customers 6. The size of discounts provided, and in some embodiments the fees paid by merchants, can be based on the number of hits the offer/website of the merchant receives, the number times the offer is displayed, the number of customers who accept the offer by making a purchase, and/or the rank of the offer, etc. In some embodiments of the invention the merchant may not offer the product at a discount, but instead the financial institution may subsidize the offer by providing the discount itself. In this instance, the financial institution would pay the merchant the full price of the product or service at the time of sale, but debit the customer account a discounted price or rebate the customers at some future point in time. The financial institution could make up for the discounts by charging the merchants a fee to display the offer to the customer 6 or by taking payments from the merchant for all of the discounts on offers provided within a certain time period.

Therefore, in some embodiments of the invention, either the merchant or the financial institution will offer customized discounts for each customer 6, which are based in part on the customer's profile data and the customer's transaction history information. As previously discussed the customer profile information could include what accounts the customer 6 has at the financial institution (checking, savings, equity line), as well as what services the customer 6 uses (such as financial planners, wealth management, etc.). The customer transaction history information could include the purchases the customer 6 has made at various stores, the costs of the purchases, time of year and day they were made, the accounts used to pay for the purchases, etc. In some embodiments, the more products or services that the merchant uses with the financial institution the greater the discount will be, the more accounts and services the customer 6 uses at the financial institution the greater the discount will be, and the more the customer 6 spends with a particular merchant the greater the discounts will be for that merchant.

The merchant offer application 10 can determine the amount of the products or services the customer 6 has with the financial institution through the customer profile information, and can use that information as a basis for making offers available to that customer 6. The amount of business includes but is not limited to, how many accounts the customer has, the amount of money in those accounts, any loans the customer 6 has with the financial institution, any financial services the customer 6 uses, etc. In one embodiment, the more products and services the customer 6 uses from the financial institution the greater the discount will be. These factors can also be combined with the customer's relationships with various merchants to determine what offers to make available to the customer 6. For example, the merchant offer application 10 can identify from the customer's transaction history what types of products and services the customer 6 has purchased from various merchants in the previous week, month, six-months, year, etc. The size of the discounts the customer 6 receives based on the customer's relationship with the merchants could based on the purchases made by the customer 6 with the merchant, and could vary in real-time or near real time each time a purchase is made or not made. For example, a merchant in some embodiments may want to offer greater discounts to a customer 6 who has not purchased anything in a while in order to try to generate new business. In other embodiments, a merchant may want to reward a loyal customer 6 in order to promote additional purchases. Therefore, in some embodiments the more the customer 6 has purchased in the past, the greater the customer's discount will be.

For example, the financial institution may have relationships with both Company "B" and Company "E". A specific TV offered through the merchant offer application 10 by Company "E" may sell for ten (10) dollars less than the same TV offered through Company "B", based on the financial institution's arrangements it has made with both merchants. However, when the customer 6 is searching for a specific TV (or TV's in general), the financial institution may identify the transactions the customer 6 has made with both businesses, by examining the transaction history information that the financial institution has. If the financial institution, for example, identifies that the customer 6 purchased two-thousand (2,000) dollars in products and services from Company "B" in the previous year, the terms of the relationship between the financial institution and Company "B" may dictate that the financial institution will offer the TV for one-hundred (100) dollars off of the typical price of the TV. Therefore, the customer 6 receives a more attractive price than she would have received because of the customer's 6 relationship with the financial institution and/or the merchant.

In other embodiments of the invention the merchant offer application 10, provides member offers, such as a list of product discounts, that are offered to all customers 6 of the merchant offer environment 1. In still other embodiments of the invention, the merchant offer application 10, provides public offers, such as a list of product discounts that are offered by the merchant to anyone in the public, not just members of the merchant offer environment 1. Furthermore, customized offers, member offers, or public offers are provided by the merchant offer application 10 and displayed through the local merchant offer application 11.

When the merchant offer application 10 identifies an offer for the customer 6 the local merchant offer application 11 notifies the customer 6 of the offer, as illustrated by block 212 in FIG. 7A. In one embodiment for example, as illustrated in FIG. 8, a notification indicator 304, such as a dollar sign or other icon or indicator could appear in the bottom of the web browser that the customer is using to view the merchant's website. In other embodiments, the notification indicator 304 could appear in the tool bar at the top or bottom of the web browser or computer screen display, or in other areas of the web browser or computer screen. The dollar sign, or other icon or notification indicator 304, signals to the customer 6 that the merchant offer application 10 identified an offer in which the customer 6 may be interested, which could save the customer 6 money. The offer may be relevant to a product or service the customer is viewing, it may be responsive to a wish list item, it may be based on just the customer's transaction history and/or profile information, etc.

As illustrated in blocks 214 and 216 of FIG. 7B, when the customer 6 selects the notification indicator 304, a pop-up window, such as a local interface 400, or other display is provided on the computer screen, or other device, illustrating the offers identified by the merchant offer application 10 as shown in FIG. 9. In some embodiments of the invention the customer 6 does not need to select the indicator to view the local interface 400. In some embodiments, the local interface 400 automatically pops-up on the screen when the merchant offer application 10 identifies an offer. In other embodiments of the invention, when an offer is identified the offer appears within the web-browser or web-browser page that the customer 6 was viewing.

The pop-up window, such as the local interface 400, provides the customer 6 with offers related to products or services, or content that the customer 6 is currently viewing at an Internet website of a merchant, products or services listed on the customer's wish list, or product or services of interest to the customer 6 based on the customer's transaction history and/or customer profile. The offers provided to the customer 6 in the window reflect offers, prices, and discounts from the current merchant or other merchants in which the customer 6 may be interested. The offers can be ranked based on various factors, such as but not limited to the discounts offered, agreements between the merchants and the financial institutions, etc. The offers, in some embodiments will include links, such as to the merchant's web pages, which provide more information about the relevant offers.

As illustrated in FIG. 10, in an exemplary embodiment of the invention, the local merchant offer application interface 400 has two sections, the accounts section 410, and the offers section 430. The accounts section 410 illustrates the available balances the customer 6 has in each of the customer's accounts. The merchant offer application 10 communicates with the local merchant offer application 11 and the account management applications 30 in the customer account systems 8 to determine and display the account balances in the local interface 400. Other sections that contain other types of information, for instance the customer's monthly budget, etc. can also be displayed in the local interface 400.

The offer section 430, in some embodiments, displays the other retailers 432 that can offer the same or similar product, the offer description 434 illustrating what the offer is (the same product or a similar one), the percent savings 436, and the actual dollar amount savings 438. In other embodiments of the invention the offer section 430, another section, or a separate tab displays related or add-on products in which the customer 6 may be interested. For example, if a customer is searching for a forty-six inch LCD TV the customer may also be interested in DVD players, or services. In one embodiment of the invention, a "see related offers" section button 440 or tab is selected by the customer 6 in order to view any related offers identified by the merchant offer application 10, as illustrated in FIG. 10. However, in some embodiments the related offers are displayed in the offer section 430 along with the product for which the customer 6 is searching. In still other embodiments of the invention, the local merchant offer application interface 400 has an advertisement section 450 that displays one or more targeted advertisements to a customer 6 based on the customer's previous purchasing history, customer profile information, and/or website content that the customer 6 is currently viewing.

As illustrated by block 218 in FIG. 7B, in some embodiments the local interface 400 provides links to websites that contain additional information about the products or services that are the subject of the offers or related offers in the offers section 430. The customer 6 selects the offer and is then taken to a website, such as the merchant's website, other website, or a display in the local interface 400, which provides more information about the savings provided by the offers. Block 220 in FIG. 7B illustrates that the customer can select the original offer that the customer 6 located or one of the replacements offers that the merchant offer application 10 identified and displayed to the customer 6.

As illustrated the by block 222 in FIG. 7B the customer 6 can also purchase related products or services in addition to, or in lieu of, the originally located products or services or replacement products or services displayed by the merchant offer application 10.

In some embodiments, the customer 6 will have to authenticate herself in order for the merchant offer application 10 to communicate with the account management applications 30, such as the customer's online banking accounts, in order to display the customer's real-time account balances. In other embodiments of the invention, the merchant offer application 10 estimates the customer's account balances based on what the balances were the last time the customer 6 made a purchase or authenticated herself. In some embodiments of the invention, the local interface 400 displays the account balances for the customer's checking account 412, savings account 414, credit card account 416, and any reward points 418 that the customer has accumulated. In still other embodiments, after the customer 6 makes purchases, the account balances displayed in the local interface 400 are updated in real-time in order to show the customer 6 how much money the customer 6 has available in each of her accounts.

In other embodiments of the invention, if the customer 6 grants access, the local merchant offer application 11 can also display the account information, such as balances, of other accounts or credit cards maintained by outside financial institutions. In these embodiments, the financial institution may have a relationship with the outside financial institutions and/or the customer 6 has supplied the merchant offer application 10 with access to the outside accounts (i.e. by providing the sign in and password information for online banking services).

After the customer 6 selects the products or services she wants to purchase, either through the Internet or at a physical store, the merchant offer application 10 assists the customer in determining how she wants to pay for the products or services. As illustrated by block 224 in FIG. 7B the customer 6 selects from which account or multiple accounts the customer 6 wants to pay for the offer selected. In some embodiments of the invention the customer's preference for paying for an offer from a particular account or set of accounts is stored in the customer profile information in the merchant offer application 10, and in such circumstances, the predetermined preference acts as a default. In some embodiments of the invention, the necessary financial and shipping information is pre-populated at check-out when the customer 6 makes a purchase. In other embodiments of the invention, the customer 6 is prompted at checkout as to how the customer wants to pay for the products and services selected. In such embodiments, a list of the customer's accounts is provided in the local interface 400 or in another pop-up window. While the financial institution will pay the merchant the full amount of the offers or the discounted amounts, in some embodiments the customer can tell the financial institution how to apply the cost of the products or services to the customer's accounts. For example, the customer for one purchase may indicate that she wants to pay 20% from her checking account and 80% from her savings account. The amounts and the various accounts can be changed for every purchase made. The decision of what account or accounts are used to make payments can be made in some embodiments at the time of purchase. In other embodiments of the invention, the customer 6 has a period of time to determine what account or accounts are debited. In such embodiments of the invention, the customer 6 logs into her online banking, merchant offer, or other account and, either at the time of purchase or thereafter, associates particular transactions and transaction amounts with particular accounts.

In some embodiments of the invention, the financial institution effectively becomes a clearing house for any of the transactions made between the customer 6 and the merchant. After the customer 6 authenticates herself as an actual customer of the financial institution, in some embodiments the financial institution guarantees payment to the merchant for the products and services. The financial institution is able to determine in each instance whether it wants to assume the risk for the transaction based on information the financial institution has for each of its customers. This is a benefit over independent credit card issuers because these companies do not know the financial well-being of one their customers outside of the customers' credit card balances and payment histories. In this respect, the merchant offer application 10 can be utilized to help customers from over spending their means and can assist the financial institution in managing risks attendant to extending consumer credit.

The actual purchase of the selected products and services from the merchant through the merchant offer environment 1 is achieved in a number of ways. For example, in one embodiment of the invention, the links for particular offers in the local interface 400 take the user to the merchant's secure website. However, in other embodiments of the invention, the links take the customer 6 to the public merchant website and the financial institution can pre-populate the account information, as well as the mailing information. In other embodiments of the invention, the account information can be a preapproved single use account number provided by the financial institution, which ties the customer 6 to the customer's accounts at the financial institution, without disclosing the customer's real account information to the merchant. In those instances where the financial institution has a pre-existing relationship with the applicable merchant, the transaction that takes place can be virtually instantaneous. The financial institution can credit the account of the merchant, if the merchant has an account at the financial institution, or in other embodiments of the invention, the financial institution can electronically transfer the money to the merchant. Alternatively, the financial institution can credit the merchant for the customers purchase on a schedule that is prearranged and agreed to by the financial institution and merchant.

After the payment method is satisfied, either the customer 6 or the financial institution can transfer the shipping address of the customer 6 to the merchant for shipping the product or providing the service. In lieu of the merchant shipping a product to the customer 6, the customer 6 can pick-up the product at the store. Alternatively, if the customer is making the purchase at a brick and mortar location the customer 6 can simply pick-up the product when purchased.

In other embodiments of the invention, the financial institution provides various financing options for the customer 6 to use in paying for the selected products or services. For example, the financial institution can allow the customer to make a purchase from a merchant, but not debit the customer's account or accounts for 30, 60, 90, etc. days. As is the case with the amount of discounts provided to various customers 6, different financing options can be provided to customers depending, in some embodiments for example, on the customer's standing with the financial institution and the number of financial of products and services the customer uses with the financial institution.

Likewise, with respect to the financial institution making payments to a merchant, there are a number of options available to complete the transition as far as the merchant is concerned. In some embodiments of the invention, the payment system and process provides settlement options to the merchant, such as real-time, 3-day, 15-day, etc. The merchants can be charged different types of fees, or no fees, depending on what payment options the merchants require. Different options may apply in different circumstances. For instance, a different settlement option might apply to different products sold by the merchant depending upon the merchant's payment obligations to its suppliers. In other embodiments, the payment options may vary depending upon the merchant's financial situation, need for cash flows, lines of credit etc. The payment option variables are monitored electronically by the financial institution, and the appropriate payment option can be selected automatically based on a series of rules in the merchant offer application.

In some embodiments of the invention the steps in blocks 204 to 224 are repeated every time the customer 6 visits a new web-site, selects a different product or service from the web-site the customer 6 is currently viewing, or when the merchant offer application 10 identifies a product or service for the customer 6 based on the customer's wish list, transaction history, or customer profile.

After a customer 6 selects a product or service, replacement, or add-on to purchase, the merchant offer application 10, in some embodiments of the invention, provides online social networking opportunities. For example, the customer 6 can rate a specific offer, merchant, or discount program. In other embodiments of the invention, the customer 6 can display in the local interface 400 the most popular offers as rated by other customers who have accepted the offer. Furthermore, in other embodiments of the invention the customer 6 can suggest to other customers a purchase or discount, that the customer 6 made, by sending an e-mail, instant message notification, text message, or other notification through a messaging service in the merchant offer application 10 or through other standard messaging formats using the merchant offer application 10. In other embodiments of the invention, the customer may join social networks or groups through the merchant offer application 10, which allow the customer 6 and other members of the groups to receive special offers that only members of the specific group can receive and use.

In addition to displaying add-on products and services, while the customer 6 is searching for specific products or services on the Internet, the merchant offer application 10 will also make add-on product or service suggestions after the customer has purchased a product or service through the merchant offer application 10. In some embodiments of the invention some types of add-ons can only be made after a particular offer is accepted and purchased by the customer 6. For example, an extended warranty for a particular product such as a forty-six inch Brand "X" television offered through a merchant is only available for purchase through that merchant if the actual product is purchased through that merchant. These additional add-ons, in some embodiments, can be displayed to the customer 6 through the local merchant offer application interface 400, after the customer 6 has purchased a particular product or service. In other embodiments of the invention the add-ons are sent to the customer 6 though e-mail, text message, instant message, or other like form of communication. In other embodiments of the invention, some add-ons are provided by the merchant offer application 10 and are based in part on product type. For example, when a blue-ray DVD player is purchased the add-ons will include Blue-ray DVDs as opposed to regular DVDs, because the customer would not likely want Blue-ray DVDs if she purchased a regular DVD player.

In some embodiments of the invention the merchant offer application 10 has a search feature that allows a customer to search for available offers, through the local merchant offer application 11, by product (i.e. SKU, model, etc.), merchant, product type, brand, manufacturer, price, discount price, location, etc. The discounts provided to the customer 6 during the search can be customized for each individual user based on relationships between the financial institution and merchants, the customer's profile information, the customer's transaction history, and/or publicly available discounts. The offers from the search, in some embodiments, are prioritized based on the customer's location, transaction history, profile information, etc.

In some embodiments of the invention the customer might not be able to find the particular product or service for which the customer 6 is searching because the product is out of stock or the service is booked, the product or service is too expensive for the customer 6, the product or service cannot be delivered in time, etc. In such cases, the merchant offer application 10 provides the customer 6 the ability to add a particular desired product or service to a wish list. The customer's individual wish list, in some embodiments, has one or more products and services that have notification alerts attached to them. The notification alerts inform the merchant offer application 10 to watch for offers for those specific products or services, and any discounts related to them. The customer can also add merchants to the wish list in order to be notified when a specific merchant is providing discounts to customers.

When the merchant offer application 10 identifies the availability of a product or service that is on the customer's wish list, the merchant offer application 10 notifies the customer. For example, the customer can identify a specific product or service, such as a forty-six inch TV, and/or a specific price for the product or service, such as one-thousand three-hundred (1,300) dollars for the forty-six inch TV. The merchant offer application 10 monitors the databases 19 in merchant offer system 3, or in some embodiments searches the Internet, for the product or service that meets the particular parameters that the customer 6 wants. The merchant offer application 10 notifies the customer 6 when one or more merchants meet the customer's parameters. In other examples, the customer 6 can identity a specific merchant, such as Company "B", or a specific type of product or service, such as a flat screen TV, and request that the merchant offer application 10 notify the customer when the merchant is having a sale, or when sales are occurring for that type of product or service. In this way the customer 6 does not have to continuously search for a product or service. Instead, the customer 6 lets the merchant offer application 10 identify the product or service for the customer 6, and then receives a notification when the particular product or service is identified.

In some embodiments of the invention the customer 6 can be notified of products or services, coupons, advertisements, reward cards or points from a merchant, etc., by the merchant offer application 10 when the customer is not even searching the web for a specific offer. The merchant offer application 10, in some embodiments, uses the customer's wish list, or the customer's profile data and transaction history, to notify the customer when one or more merchants are offering a particular product or service in which the customer 6 might be interested. In one embodiment of the invention, the offers found by the merchant offer application 10 are sent to the user though various communication channels, such as, but not limited to e-mail, SMS, text messages, financial institution statements, on receipts for purchases online or at brick an mortar institutions, or ATM transactions, etc.

In some embodiments of the invention, the financial institution can monitor each customer's savings realized and not realized by using or not using the merchant offer application 10. A system and process is used for determining and displaying to customers 6 the amount of money saved, including, but not limited to percentages saved, total savings, what could have been saved, etc. The merchant offer application 10, either online, though the local merchant offer application 11 or online banking, or through paper statements, illustrates the amount of money the user saved or could have saved by using the merchant offer application 10 on both a total basis over a specified time period, as well as on a transaction-by-transaction basis. In other embodiments of the invention, the amount saved if the customer 6 would have enrolled in more financial institution product or services could also be illustrated online or in paper statements. Also in some embodiments of the invention, discounts, e-coupons, merchants, etc. can be suggested for future purchases through the online or paper statements.

In other embodiments of the invention the merchant offer application 10 is accessed though and runs inside one or more of the account management applications 30, such as an online financial banking application. For example, in some embodiments the customer 6 logs onto to the customer's online financial banking accounts, and searches for offers through the online financial banking account application. The merchant offer application 10, acting through the online financial banking account application, provides offers, add-ons, etc. to the customer 6 as previously discussed. However, in this embodiment the offers are displayed though the online financial banking application not through a separate local merchant offer application 11 that was downloaded to the customer computer systems 4. Therefore, in this embodiment, the customer 6 could use the merchant offer application 10 on any computer because the merchant offer application 10 and local merchant offer application 11 are run through an online financial banking application and are not tied to a customer's specific computer system 4.

The merchant applications 40, in some embodiments, allow the merchants to access the merchant offer application 10 over the network 2 through the merchant offer system 3. The merchant offer application 10, in some embodiments, has a merchant interface that the financial institution uses to mange the merchant network by only allowing access to the merchant interface to specific merchants that the financial institution has certified for inclusion into the merchant offer environment 1. The merchant interface allows a merchant to enter offers into the merchant offer application 10 that are available to all customers 6, groups of customers 6, or individual customers 6 based on customer demographic information. In some embodiments, the merchant interface also allows a merchant to monitor its offers, such as the status and success of its offers.

The financial institution will first determine what merchants to certify for access to the merchant offer application 10. In some embodiments, the merchant must meet quality standards set by the financial institution before the merchant is certified. In some embodiments, the quality standards include the financial stability of the merchant, customer ratings of the merchant, supplier and distributor ratings of the merchant, product or service delivery time, payment timeliness, etc. These factors can be determined by the financial institution through a number of different channels. For example the merchant financial stability could be determined from the accounts the merchant has with the financial institution, other financial institutions, or outside rating agencies. Customer, supplier, or distributor ratings of the merchant can be determined from consumer advocacy groups, or other rating organizations, that the financial institution uses or with which the financial institution has partnered.

After the financial institution certifies the merchants for access to the merchant interface, the financial institution provides the merchants with user names and passwords or other merchant authentication mechanisms that allow the merchant to access the merchant interface through the merchant offer application 10. Thereafter, the merchant can access the merchant interface and authenticate that the financial institution has certified that the merchant can access the merchant offer application 10. The authentication mechanisms also indicate to the financial institution that the current user has authority to create and/or monitor offers for the particular merchant. The merchant can then begin to enter offers for the financial institution's customers 6.

In some embodiments the merchant can create, modify, and control the offers in the merchant applications 40 and upload the offers to the merchant offer application 10. In other embodiments of the invention the merchant can create the offers directly in the merchant offer application 10, through the merchant interface.

In some embodiments of the invention, when entering offers into the merchant offer application 10 the merchant can set various preferences associated with a product or service, such as, but not limited to, a specific price or price range for which the merchant is willing to sell a product or service, a discount percentage to offer, identification of products or services or types of products or services to which to apply the offer, how long the offer will be available to customers, if the offer changes over time, if additional discounts apply to the product or service, etc. For example, to name a few, the merchant may set a particular price for a product or service which will gradually decline in price automatically every month. The merchant may indicate that an offer is only good for a month. The merchant may also indicate that a product or service will have an additional discount if the customer purchases other products or services from the merchant at the same time. The merchant may offer credits or rebates to all the customers who purchase a product or service, if there are a specified number of sales of the product or service.

In some embodiments of the invention, the merchant can also set what customer should receive the offers based on customer demographic information, such as, but not limited to age, geographic location, customer purchasing history, groups or clubs the customer is associated with, etc. For example, some offers may apply to all of the customers 6 in the merchant offer application. However, some offers may only apply to customers who live in a particular state or region. The merchant may also limit offers to individual customers 6 who have spent a specific amount of money with the merchant in the past, or who have purchased a specific product or service from the merchant over a specific time frame.

The offers entered into the merchant offer application 10 can be provided to customers 6 in real-time, or in other embodiments can be set to take effect at a later date in the future or not until the financial institution has approved the offer submitted by the merchant. The merchant has the ability, in some embodiments, to update the offers that they entered into the merchant offer application 10 anytime to try to influence sales of various products or services. However, in some embodiments, some offers may not be able to be changed for a period of time once they are imputed into the system.

Since the financial institution is providing a service to its customers 6 by providing offers to the customers 6 from various merchants, any merchants who are not providing adequate customer service are also reflecting negatively on the financial institution. Therefore, not only does the financial institution has the ability to manage the merchants in the merchant offer environment 1 by determining what merchants are allowed into the merchant offer environment 1, but they also have the ability to remove merchants from the merchant offer environment 1. In some embodiments, the financial institutions can make periodic reviews of merchants that have been certified, in order to make sure the merchants are still financially stable, or have received positive customer feedback.

In some embodiments, the merchant interface allows the merchant to monitor current offers. For example, the merchant interface may create charts, graphs, tables, and/or other statistics for the merchant and display these to the merchant when the merchant logs into the merchant interface. These statistics may relate to particular offers and the success thereof, such as how often they are displayed to potential customers, how often they are accepted, the amount of money being made or discounted, and/or the like. The statistics may also provide an overview of the success of the overall relationship with the financial institution and use of the merchant offer system 3.

Thus, systems, apparatus, methods, and computer program products herein described provide for monitoring transactions and providing savings metrics associated with the transaction in conjunction with a financial institution-based merchant offer program. By monitoring all transactions and providing the customer with savings metrics related to how much the customer saved using merchant offers provided by the program, as well as, how much the customer could have saved if the customer had used an available offer, the customer benefits from knowing the financial impact of the program and the financial institution benefits by enticing the customer to use the program more frequently.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing savings monitoring in a financial institution-based merchant-offer program, the method comprising:

monitoring, by a computing device processor, one or more financial institution accounts held by a financial institution customer to identify (1) one or more first transactions conducted by the customer with a plurality of different merchants over a predetermined time period, wherein the first transactions are identified based on customer acceptance of customer-specific first-merchant-offers associated with the financial institution-based merchant-offer program, which were offered to the customer based on customer-specific information, wherein customer-specific information comprises previous purchase transactions using a financial institution account including merchant-offer program transactions and non-merchant-offer program transactions and (2) one or more second transactions, wherein one or more customer-specific second merchant-offers associated with the financial institution-based merchant-offer program were available concurrent with the second transaction, wherein the customer-specific second merchant-offers were associated with an item in the second merchant transactions and wherein the customer-specific second merchant-offers were not applied by the financial institution customer in the second transactions;

determining, by a computing device processor, savings metrics associated with the first transactions and based on savings realized from acceptance of the customer-specific first merchant-offers, wherein the savings metrics include (1) total amount saved for the first transactions over the predetermined time period and (2) total amount saved over a life of the financial institution-based merchant-offer program;

determining, by a computing device processor, lost savings metrics associated with the second merchant transactions and based on savings that could have been realized from acceptance of the customer-specific second merchant-offers, wherein the lost savings metrics include (1) total amount of lost savings for the second transactions over the predetermined time period and (2) total amount of lost savings over the life of the financial institution-based merchant-offer program; and providing the savings metrics and the lost savings metrics to the financial institution customer.

2. The method of claim 1, wherein providing further comprises providing the savings metrics to the financial institution customer by inclusion in a first transaction receipt.

3. The method of claim 1, wherein determining the savings metrics associated with the first transactions further comprises determining savings amounts associated with the first transactions and further comprising, in response to determining the savings amounts, automatically transferring, by a computing device processor, at least a portion of the savings amounts from a first customer-designated account to a second customer-designated account.

4. An apparatus for providing savings monitoring in a financial institution-based merchant-offer program, the apparatus including:

a computing platform including at least one processor and a memory;

a financial institution-based merchant-offer program application stored in the memory, executable by the processor and configured to communicate customer-specific merchant-offers to financial institution customers based on authentication of the customer;

a transaction monitoring routine stored in the memory, executable by the at least one processor and configured to monitor one or more financial institution accounts held by the financial institution customer to identify (1) one or more first transactions conducted by the customer with a plurality of different merchants over a predetermined time period, wherein the first transactions are identified based on customer acceptance of customer-specific first merchant-offers associated with the financial institution-based merchant-offer program, which were offered to the customer based on customer-specific information, wherein customer-specific information comprises previous purchase transactions using a financial institution account including merchant-offer program transactions and non-merchant-offer program transactions and (2) one or more second transactions, wherein one or more customer-specific second merchant-offers associated with the financial institution-based merchant-offer program were available concurrent with the second transaction, wherein the customer-specific second merchant-offers were associated with an item in the second merchant transactions and wherein the customer-specific second merchant-offers were not applied by the financial institution customer in the second transactions; and a savings metric determination routine stored in the memory, executable by the processor and configured to determine (1) savings metrics associated with the first transactions and based on savings realized from acceptance of the customer-specific first merchant-offers, wherein the savings metrics include (i) total amount saved for the first transactions over the predetermined time period and (ii) total amount saved over a life of the financial institution-based merchant-offer program and (2) lost savings metrics associated with the second merchant transactions and based on savings that could have been realized from acceptance of the customer-specific second merchant-offers, wherein the lost savings metrics include (i) total amount of lost savings for the second transactions over the predetermined time period and (ii) total amount of lost savings over the life of the financial institution-based merchant-offer program.

5. The apparatus of claim 4, wherein the financial institution-based merchant-offer program application further comprises a user interface routine configured to provide the savings metrics to the financial institution customer.

6. The apparatus of claim 4, further comprising a transaction receipt routine stored in the memory, executable by the processor and configured to provide the savings metrics to the financial institution customer by inclusion in a first transaction receipt.

7. The apparatus of claim 4, wherein the savings metric determination routine is further configured to determine savings amounts associated with the first transactions and further comprising a savings transfer routine stored in the memory, executable by the processor and configured to, in response to determining the savings amounts, automatically transferring at least a portion of the savings amounts from a first customer-designated account to a second customer-designated account.

8. A computer program product comprising:
a non-transitory computer-readable medium comprising:
a first set of codes for causing a computer to monitor the one or more financial institution accounts held by a financial institution customer to identify (1) one or more first transactions conducted by the customer with a plurality of different merchants over a predetermined time period, wherein the first transactions are identified on customer acceptance of customer-specific first merchant-offers associated with the financial institution-based merchant-offer program, which were offered to the customer based on customer-specific information, wherein customer-specific information comprises previous purchase transactions using a financial institution account including merchant-offer program transactions and non-merchant-offer program transactions and (2) one or more second transactions, wherein one or more customer-specific second merchant-offers associated with the financial institution-based merchant-offer program were available concurrent with the second transaction, wherein the customer-specific second merchant-offers were associated with an item in the second merchant transactions and wherein the customer-specific second merchant-offers were not applied by the financial institution customer in the second transactions;

a second set of codes for causing a computer to determine (1) savings metrics associated with the first transactions and based on savings realized from acceptance of the customer-specific first merchant-offers, wherein the savings metrics include (i) total amount saved for the first transactions over the predetermined time period, and (ii) total amount saved over a life of the financial institution-based merchant-offer program, and (2) lost savings metrics associated with the second merchant transactions and based on savings that could have been realized from acceptance of the customer-specific second merchant-offers, wherein the lost savings metrics include (i) total amount of lost savings for the second transactions over the predetermined time period and (ii) total amount of lost savings over the life of the financial institution-based merchant-offer program; and a third set of codes for causing a computer to provide the one or more savings metrics to the financial institution customer and the one or more lost savings metrics to the financial institution customer.

9. The computer program product of claim 8, wherein the third set of codes is further configured to cause the computer to provide the savings metrics to the financial institution customer by a financial institution-based merchant-offer program user interface application.

10. The computer program product of claim 8, wherein the third set of codes is further configured to cause the computer to provide the savings metrics to the financial institution customer by inclusion in a first transaction receipt.

11. The computer program product of claim 8, wherein the second set of codes is further configured to cause the computer to determine savings amounts associated with the first transactions and further comprising a fourth set of codes for causing a computer to, in response to determining the savings amounts, automatically transfer at least a portion of the savings amounts from a first customer-designated account to a second customer-designated account.

* * * * *